United States Patent
Piper et al.

(10) Patent No.: US 10,770,853 B1
(45) Date of Patent: Sep. 8, 2020

(54) ELECTRICAL POWER COUPLER FOR PORTABLE ELECTRONIC COMPUTING DEVICE AND FOR CASE FOR PORTABLE ELECTRONIC COMPUTING DEVICE

(71) Applicant: Pioneer Square Brands, Inc., Seattle, WA (US)

(72) Inventors: Brian Lewis Piper, Seattle, WA (US); Michael Cooper Ferren, Camus, WA (US); Jaimie Emerald Chan, Renton, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 16/741,604

(22) Filed: Jan. 13, 2020

(51) Int. Cl.
| | | |
|---|---|---|
| *H01R 13/44* | (2006.01) | |
| *H01R 31/06* | (2006.01) | |
| *H01R 43/26* | (2006.01) | |
| *H01R 13/62* | (2006.01) | |
| *G06F 1/16* | (2006.01) | |

(52) U.S. Cl.
CPC ......... *H01R 31/06* (2013.01); *H01R 13/6205* (2013.01); *H01R 43/26* (2013.01); *G06F 1/1626* (2013.01)

(58) Field of Classification Search
CPC ..... H01R 13/447; A45C 11/00; G06F 1/1628; G06F 1/1626; G06F 1/184; G06F 1/1616
USPC ...... 439/135, 136; 206/305, 320; 361/679.3, 361/679.32, 679.55
See application file for complete search history.

(56) References Cited

U.S. PATENT DOCUMENTS

| | | | | |
|---|---|---|---|---|
| 5,535,274 A * | 7/1996 | Braitberg | ............ | H04M 1/738 379/446 |
| 7,688,580 B2 * | 3/2010 | Richardson | ........... | G06F 1/1632 361/679.56 |
| 7,889,489 B2 * | 2/2011 | Richardson | ........... | G06F 1/1626 206/305 |
| 8,199,464 B2 * | 6/2012 | Zuo | ..................... | H01R 13/447 200/302.1 |
| 8,246,129 B2 * | 8/2012 | Wang | .................. | G11B 33/124 312/332.1 |
| 8,363,386 B2 * | 1/2013 | Cheng | ................... | G06F 1/1656 361/600 |
| 8,408,924 B1 * | 4/2013 | Queru | ................... | H01R 31/06 439/136 |
| 8,763,802 B2 * | 7/2014 | Ellis-Brown | ......... | G06F 1/1628 206/320 |

(Continued)

*Primary Examiner* — Thanh Tam T Le
(74) *Attorney, Agent, or Firm* — Grandview Law

(57) ABSTRACT

Systems and methods are involved with but are not limited to an apparatus including an electrical power coupler for an electronic tablet computing device, the electronic tablet computing device having an electrical-power-capable receptacle, the electrical power coupler for a tablet case assembly, the tablet case assembly having an electrical-power-coupler docking bay, the electrical power coupler including a coupler plug sized and shaped to removably couple with the electrical-power-capable receptacle of the electronic tablet computing device, the electrical power coupler sized and shaped to removably couple with the electrical-power-coupler docking bay of the tablet case assembly; a first coupler electrode; and a second coupler electrode, the coupler plug being in electrical connection with the first coupler electrode and with the second coupler electrode.

17 Claims, 20 Drawing Sheets

(56) References Cited

U.S. PATENT DOCUMENTS

| | | | | |
|---|---|---|---|---|
| 8,910,788 B2 * | 12/2014 | Roach | .................... | A45C 11/00 |
| | | | | 206/363 |
| 8,929,057 B2 * | 1/2015 | Rauta | .................. | H04B 1/3888 |
| | | | | 206/301 |
| 9,300,081 B2 * | 3/2016 | Rudisill | ................. | H01R 11/30 |
| 9,300,344 B2 * | 3/2016 | Rayner | ................ | G06F 1/1613 |
| 9,462,099 B2 * | 10/2016 | Wilson | ................ | H04M 1/185 |
| 9,614,569 B2 * | 4/2017 | Alsberg | ............... | H04B 1/3888 |
| 10,457,441 B2 * | 10/2019 | O'Neill | ................ | B65D 11/00 |
| 2014/0262847 A1 * | 9/2014 | Yang | .................... | A45C 11/00 |
| | | | | 206/37 |
| 2015/0189780 A1 * | 7/2015 | Su | ....................... | H05K 5/0247 |
| | | | | 361/807 |
| 2015/0214991 A1 * | 7/2015 | Ranchod | ................ | H04M 1/04 |
| | | | | 455/575.8 |

* cited by examiner

ELECTRICAL POWER COUPLER FOR
PORTABLE ELECTRONIC COMPUTING
DEVICE AND FOR CASE FOR PORTABLE
ELECTRONIC COMPUTING DEVICE

BRIEF SUMMARY OF THE INVENTION

In one or more aspects, an apparatus includes, but is not limited to an electrical power coupler for an electronic tablet computing device, the electronic tablet computing device having an electrical-power-capable receptacle, the electrical power coupler for a tablet case assembly, the tablet case assembly having an electrical-power-coupler docking bay, the electrical power coupler including a coupler plug sized and shaped to removably couple with the electrical-power-capable receptacle of the electronic tablet computing device, the electrical power coupler sized and shaped to removably couple with the electrical-power-coupler docking bay of the tablet case assembly; a first coupler electrode; and a second coupler electrode, the coupler plug being in electrical connection with the first coupler electrode and with the second coupler electrode.

In one or more aspects, an apparatus includes, but is not limited to an electrical power coupler for an electronic tablet computing device, the electronic tablet computing device having an electrical-power-capable receptacle, the electrical power coupler for a tablet case assembly, the tablet case assembly having an electrical-power-coupler docking bay, the electrical power coupler including a coupler plug sized and shaped to removably couple with the electrical-power-capable receptacle of the electronic tablet computing device, the electrical power coupler sized and shaped to removably couple with the electrical-power-coupler docking bay of the tablet case assembly; a first coupler electrode; a second coupler electrode, the coupler plug being in electrical connection with the first coupler electrode and with the second coupler electrode; a first coupler side face longitudinally elongated groove and a second coupler side face longitudinally elongated groove sized, shaped, and positioned on the coupler plug to couple with the electrical-power-coupler docking bay when the coupler plug is coupled with the electrical-power-capable receptacle; and a first coupler side face notch and a second coupler side face notch sized, shaped, and positioned on the coupler plug to couple with the electrical-power-coupler docking bay when the coupler plug is coupled with the electrical-power-capable receptacle; and a coupler base portion and a coupler extension portion, the first coupler electrode and the second coupler electrode extending from the coupler base portion a in a first direction, the coupler extension portion extending from the coupler base portion in a second direction substantially opposite from the first direction, the electrical power coupler sized and shaped to be positioned adjacent a two-step staircase formation of the electrical-power-coupler docking bay; and a first coupler side face pin and a second coupler side face pin positioned on the electrical power coupler to allow the electrical power coupler to be coupled with the electrical-power-coupler docking bay as the electrical power coupler is able to move between a first position with the coupler plug being in a coupled condition with the electrical-power-capable receptacle of the electronic tablet computing device 10 and a second position with the coupler plug being in an uncoupled condition from the electrical-power-capable receptacle.

In one or more aspects, an apparatus includes, but is not limited to a method for an electrical power coupler including coupling the electrical power coupler with a tablet case assembly; coupling a coupler plug of the electrical power coupler with an electrical-power-capable receptacle of the electronic tablet computing device while the electrical power coupler remains coupled with the tablet case assembly; and uncoupling the coupler plug of the electrical power coupler from the electrical-power-capable receptacle of the electronic tablet computing device while the electrical power coupler remains coupled with the tablet case assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE SEVERAL
VIEWS OF THE DRAWING

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of case for portable electronic computing case based articles of manufacture, compositions of matter, systems for producing and/or methods for producing same that may provide context, for instance, in introducing one or more processes and/or devices described herein.

Figure 1:
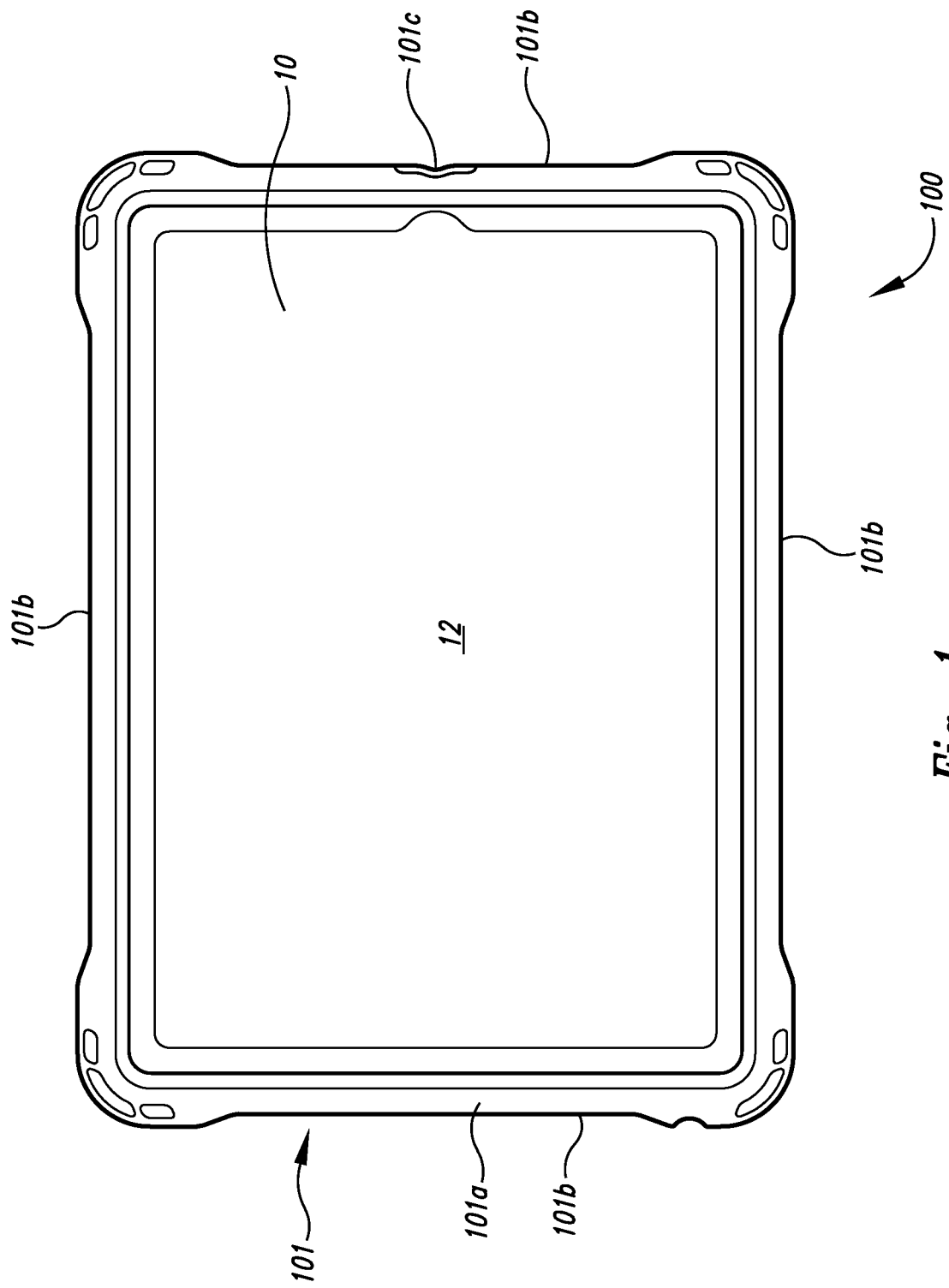
FIG. 1 is a top plan view of tablet case assembly containing electrical-power-capable receptacle equipped electronic tablet computing device.
Figure 14:
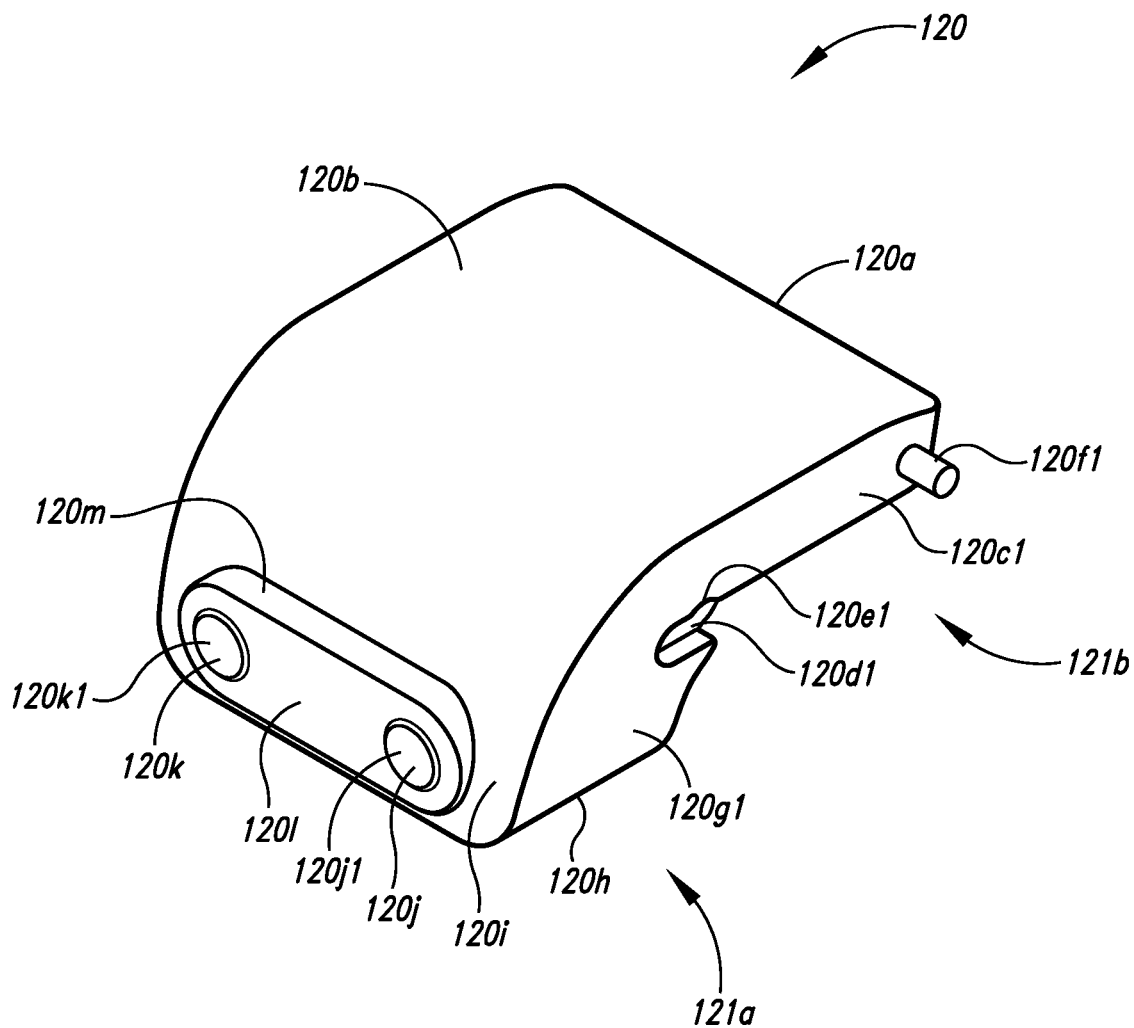
FIG. 14 is a front perspective view of electrical power coupler.
Figure 18:
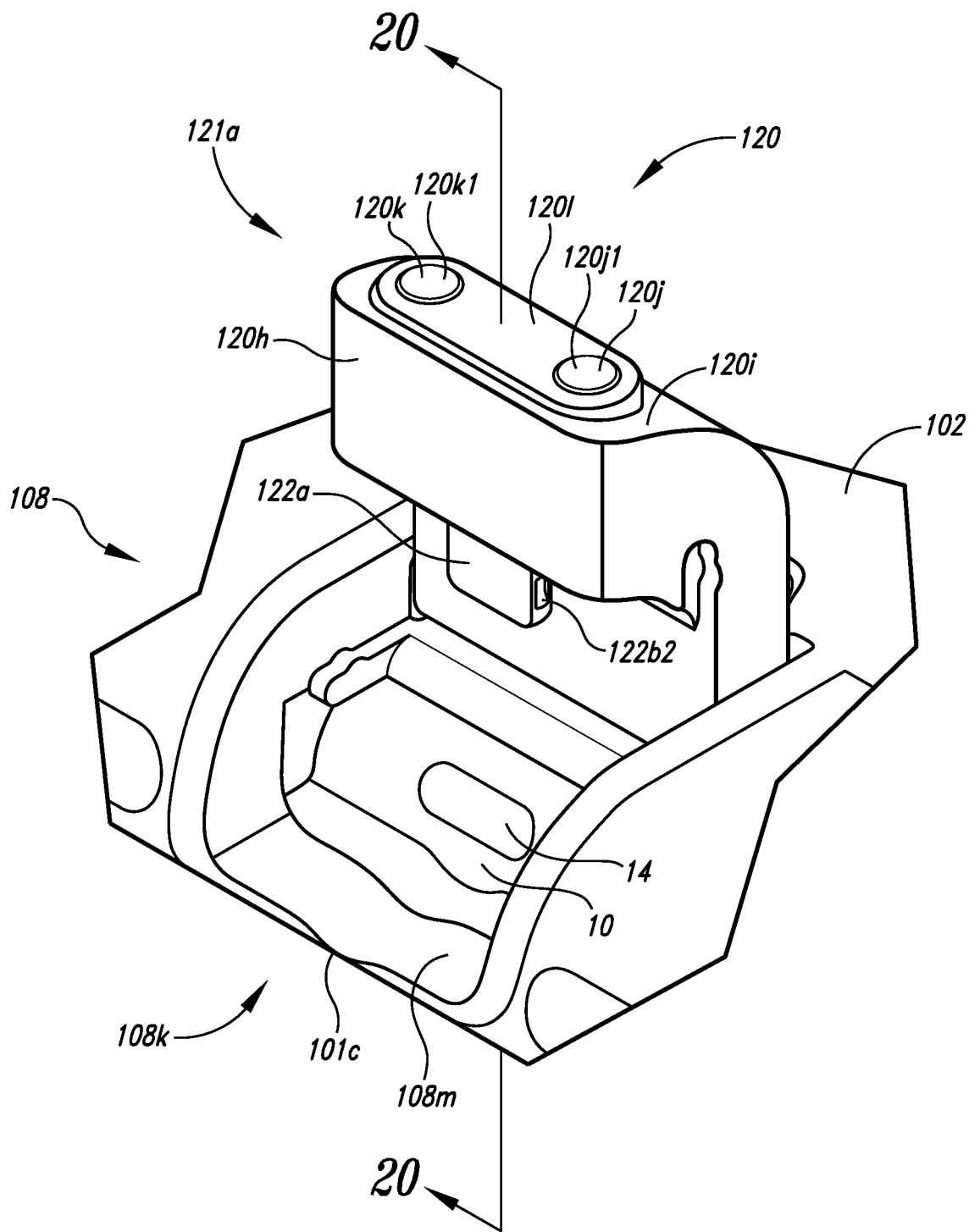

FIG. 18 is a front perspective view of electrical power coupler of FIG. 14 shown coupled with an enlarged rear perspective view of a portion of tablet case assembly of FIG. 1 showing further detail of electrical-power-coupler docking bay and showing electronic tablet computing device being contained by tablet case assembly and with electronic tablet computing device being not coupled with electrical power coupler.

Figure 19:
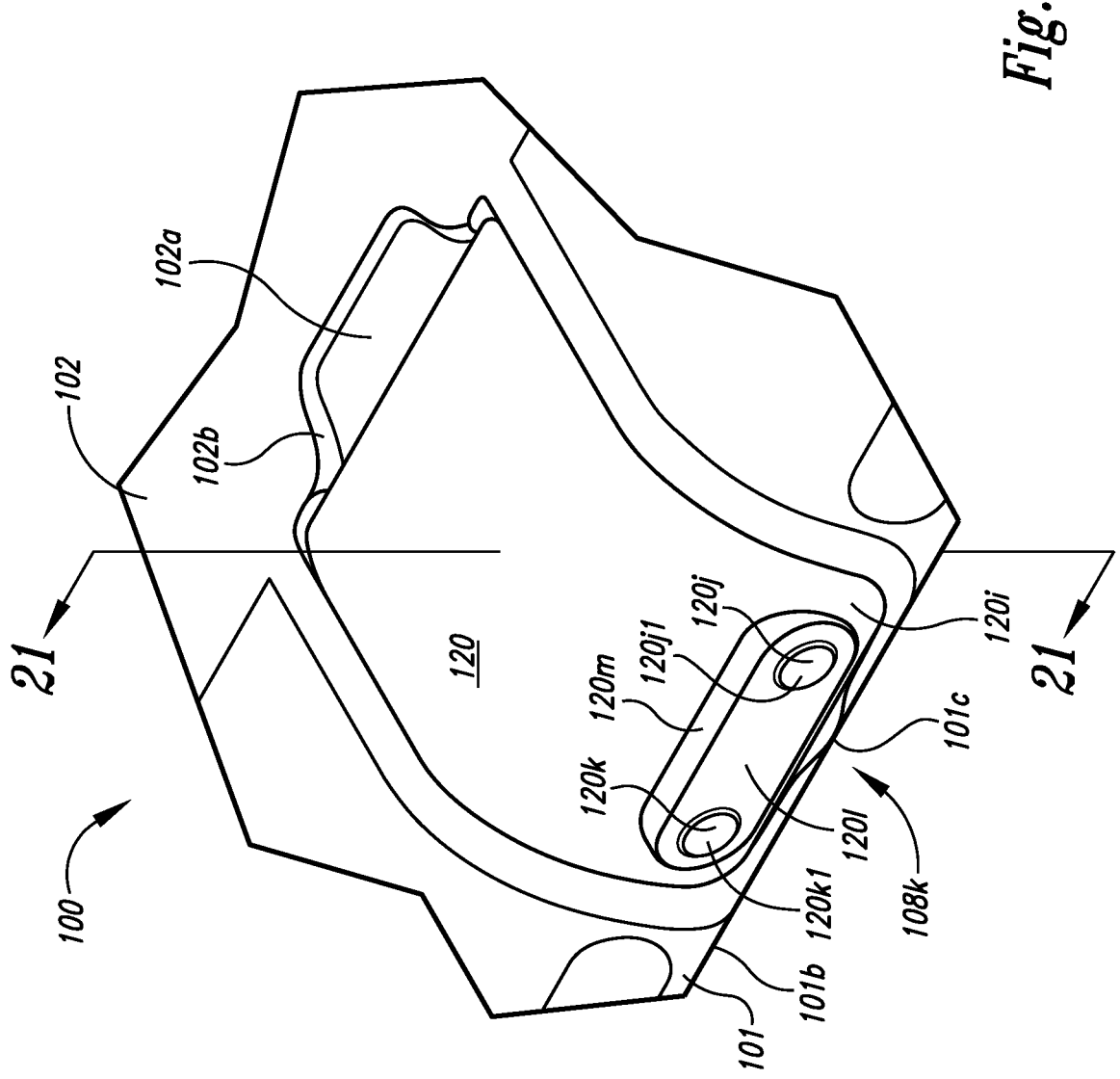

FIG. 19 is a front perspective view of electrical power coupler of FIG. 14 shown coupled with an enlarged rear perspective view of a portion of tablet case assembly.

Figure 20:
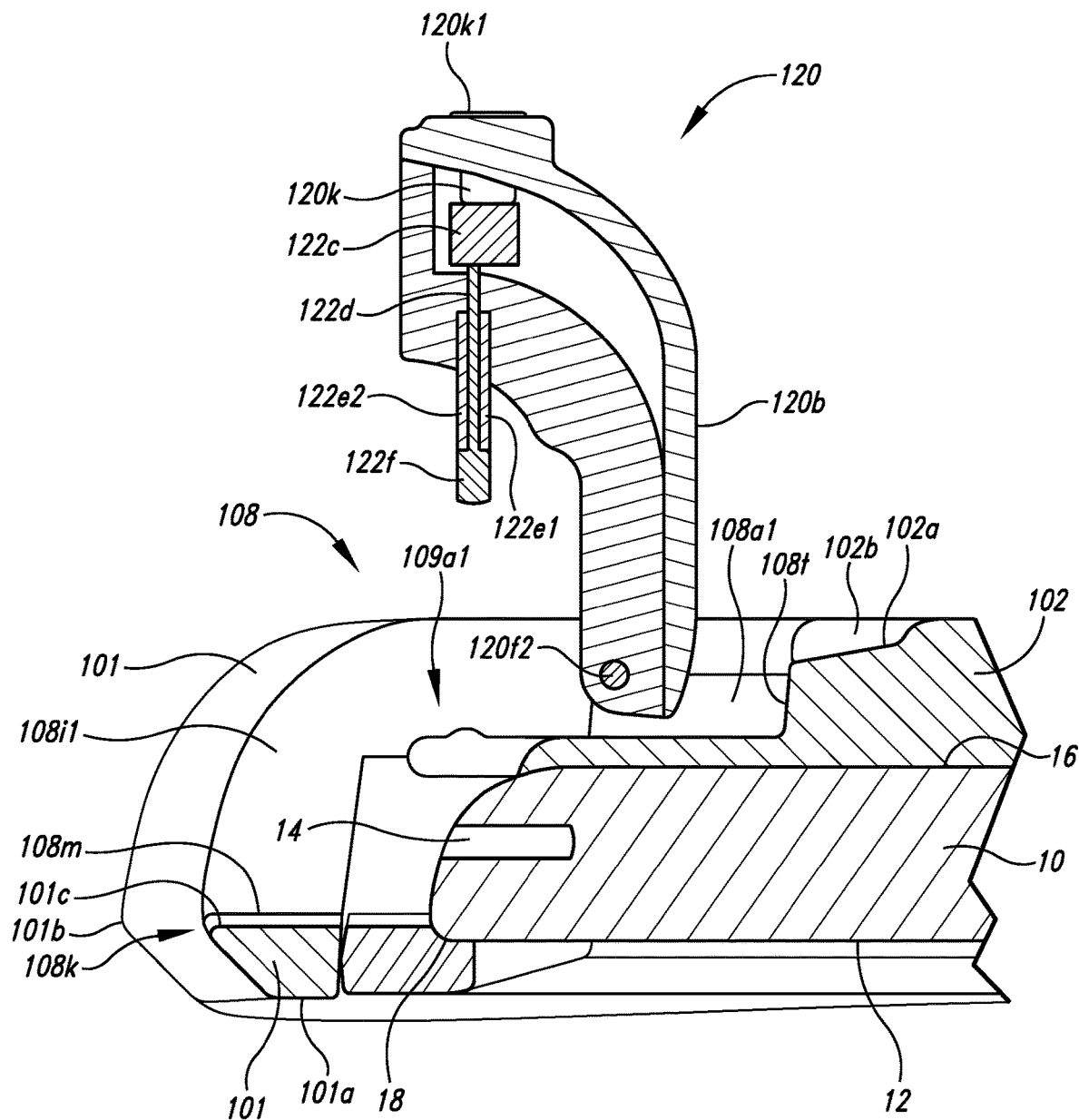

FIG. 20 is a side-elevational cross-sectional view of electrical power coupler of FIG. 14 shown coupled with a side-elevational cross-sectional view of a portion of tablet case assembly of FIG. 1 showing further detail of electrical-power-coupler docking bay and showing electronic tablet computing device being contained by tablet case assembly 100 and with electronic tablet computing device being not coupled with electrical power coupler taken along the 20-20 cut line of FIG. 18.

Figure 21:
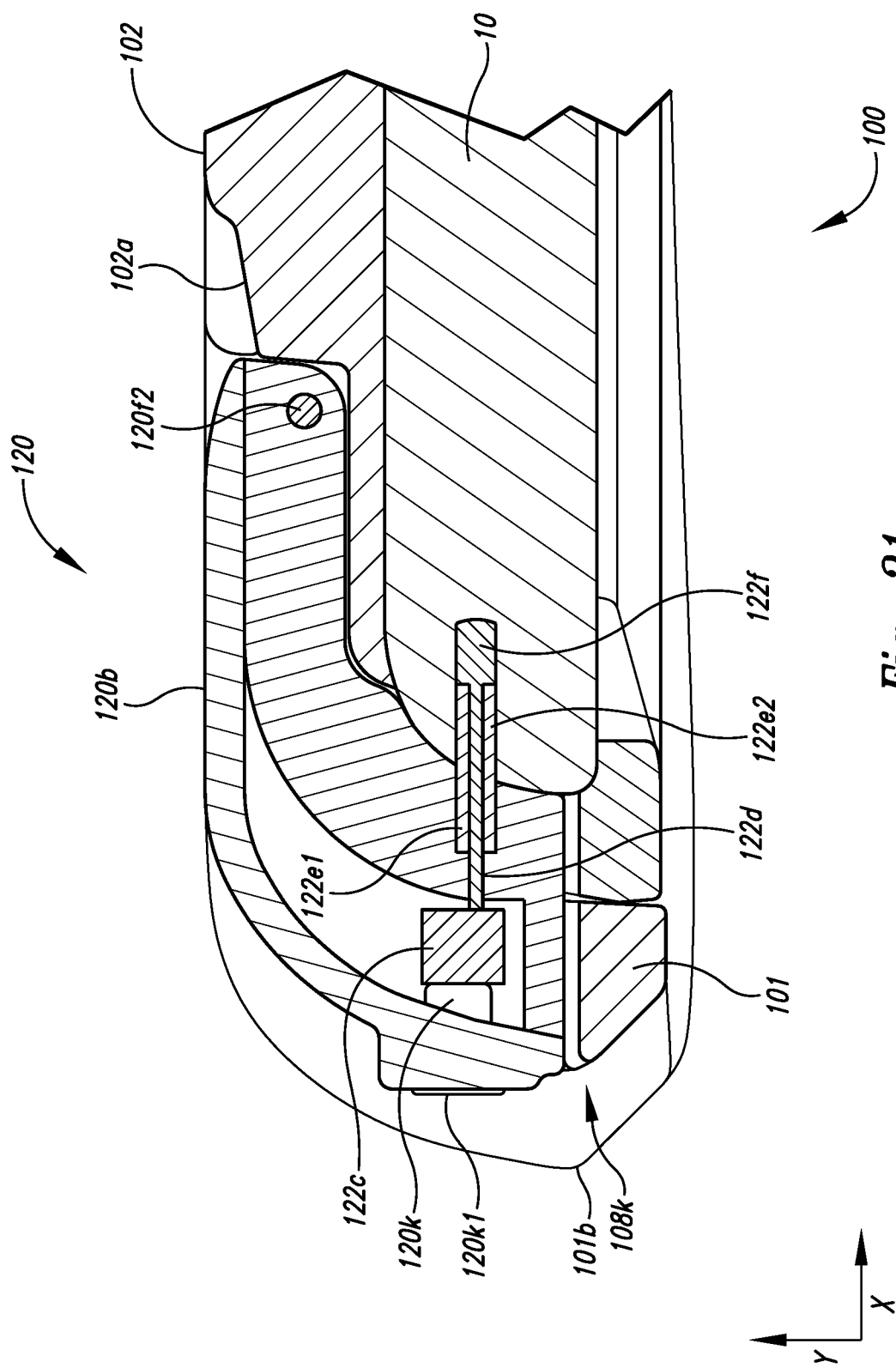

FIG. 21 is a side-elevational cross-sectional view of electrical power coupler of FIG. 14 shown coupled with a side-elevational cross-sectional view of a portion of tablet case assembly of FIG. 1 showing further detail of electrical-power-coupler docking bay and showing electronic tablet computing device being contained by tablet case assembly and electronic tablet computing device coupled with electrical power coupler taken along the 21-21 cut line of FIG. 19.

Figure 22:
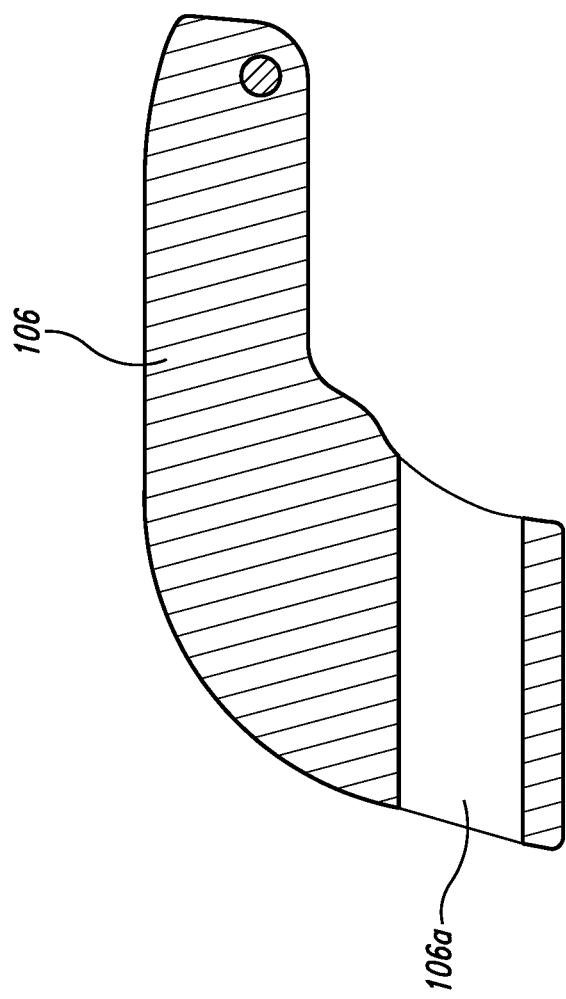

FIG. 22 is a cross-sectional view of electrical-power-coupler docking bay cover.

DETAILED DESCRIPTION OF THE INVENTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Portable electronic devices, such as laptop-shaped electronic computing devices having stands integrated therein, along with their conventional cases, can pose challenges in ease of use for containment by such cases.

Turning to FIG. 1, depicted therein is a top plan view of tablet case assembly 100 containing electronic tablet computing device 10 with its tablet display 12 being shown. The tablet case assembly 100 includes peripheral portion 101 with peripheral portion first surface (e.g., peripheral portion front display-side surface) 101a, peripheral portion first edge (e.g., peripheral portion front display-side edge) 101b, and peripheral portion coupler pry notch first edge (e.g., peripheral portion coupler pry notch front display-side edge) 101c.

Figure 2:
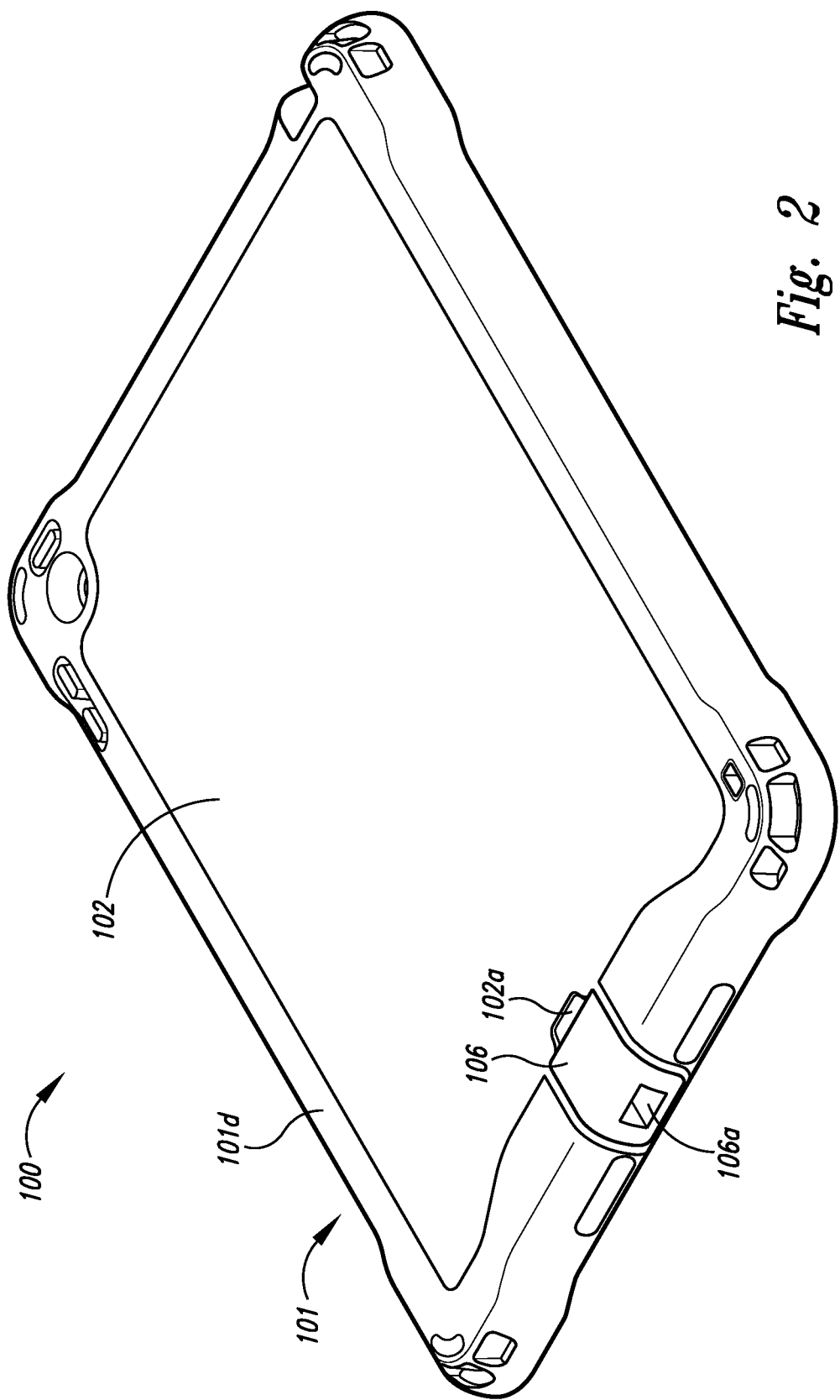
FIG. 2 is a rear perspective view of tablet case assembly of FIG. 1.

Turning to FIG. 2, depicted therein is a rear perspective view of tablet case assembly 100 showing it having peripheral portion second surface (e.g., peripheral portion rear surface) 101d with engagement aperture 101e and first bounded case portion exterior surface (e.g., rear bounded case surface) 102 with bounded case portion finger recess exterior surface 102a with first bounded case portion exterior surface 102 being at least partially surrounded by the peripheral portion 101. Also shown is electrical-power-coupler docking bay cover 106 with passthrough 106a coupled to tablet case assembly 100; electrical-power-coupler docking bay cover 106 is configured to removably couple with the peripheral portion 101 to cover the electrical-power-coupler docking bay 108 when so coupled.

Figure 3:
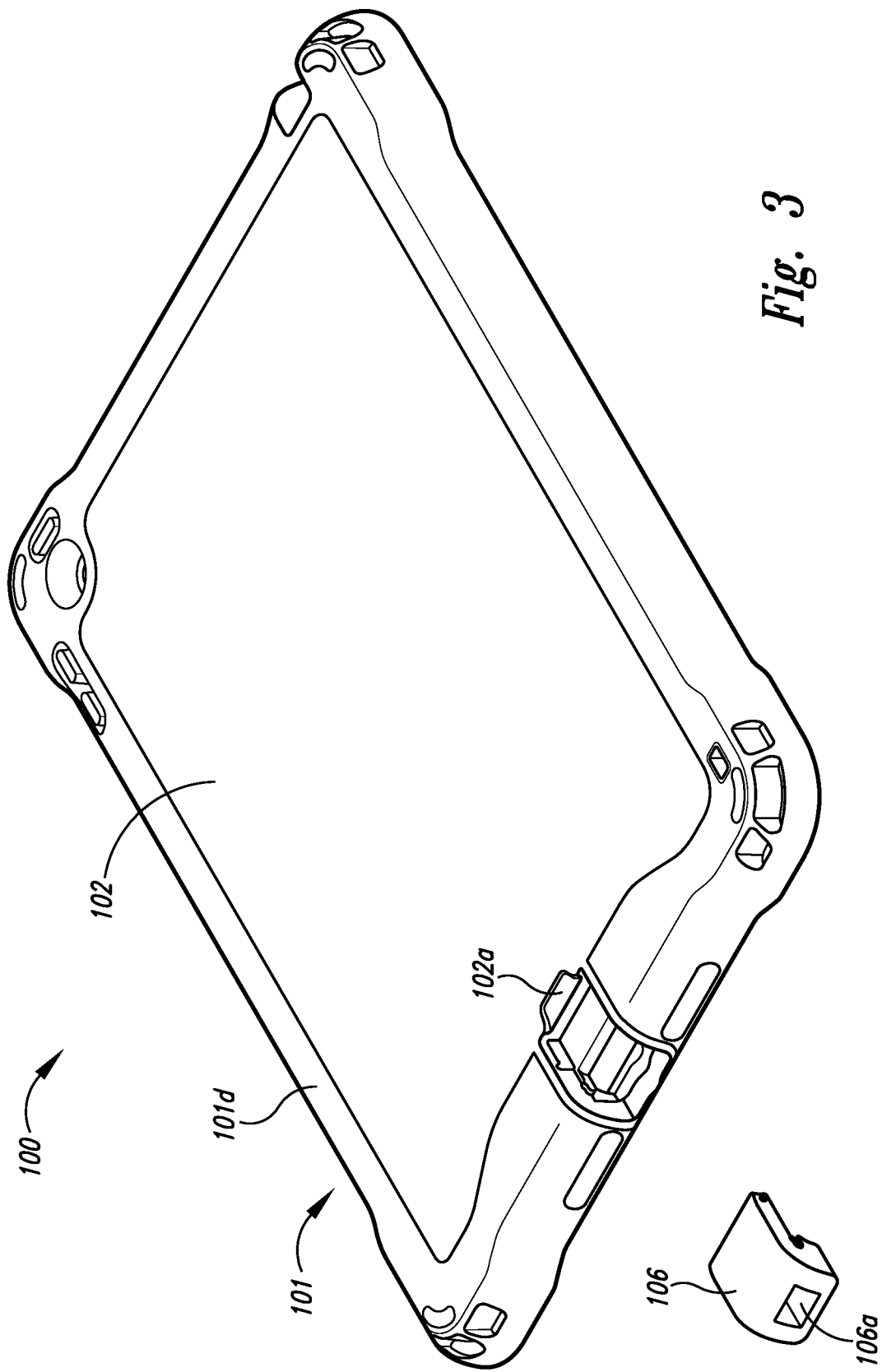
FIG. 3 is a rear perspective view of tablet case assembly of FIG. 1 showing electrical-power-coupler docking bay cover removed tablet case assembly thereby showing electrical-power-coupler docking bay.
Figure 4:
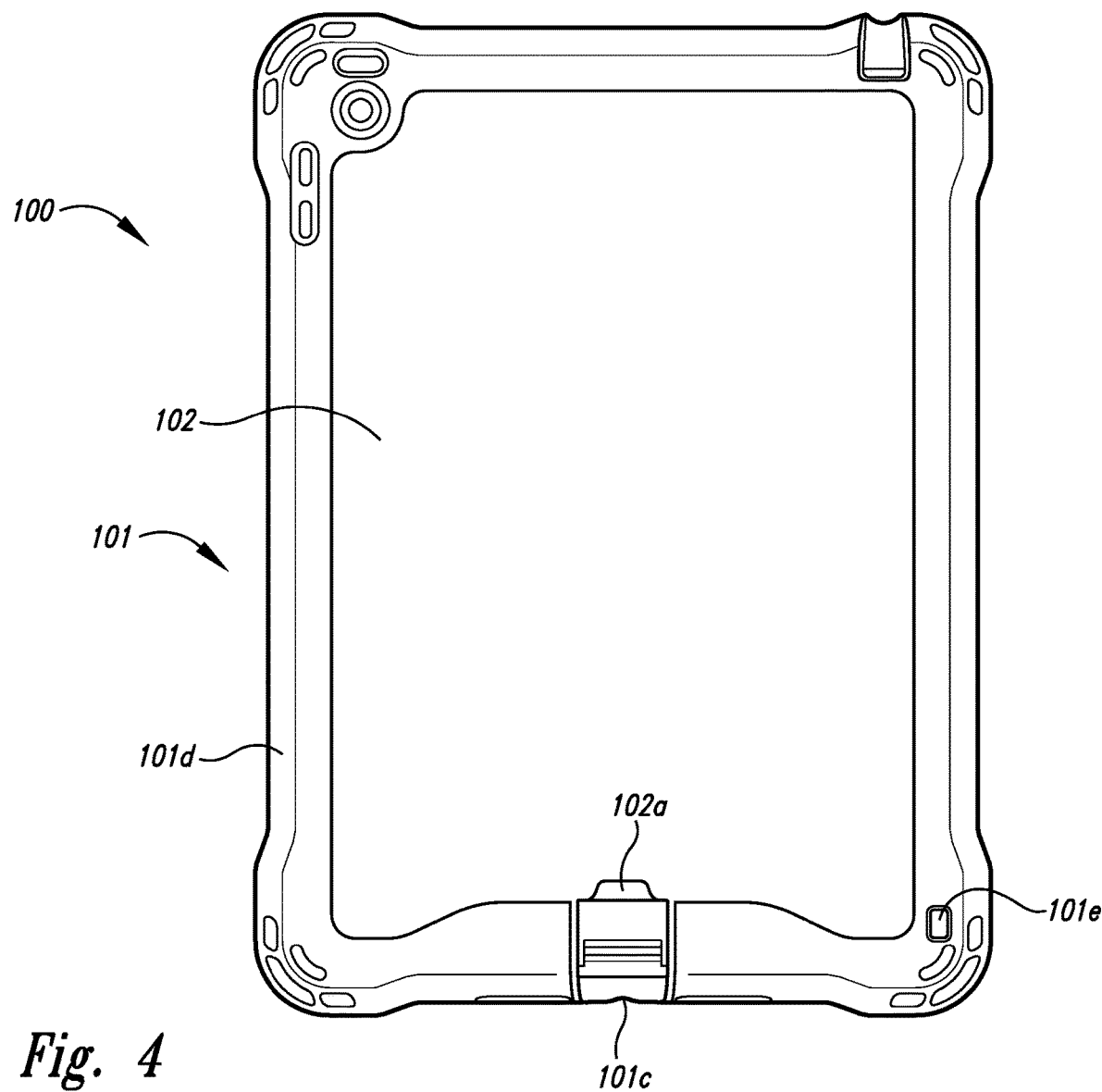
FIG. 4 is a bottom plan rear view of tablet case assembly of FIG. 1 showing electrical-power-coupler docking bay cover removed tablet case assembly thereby showing electrical-power-coupler docking bay.
Figure 5:
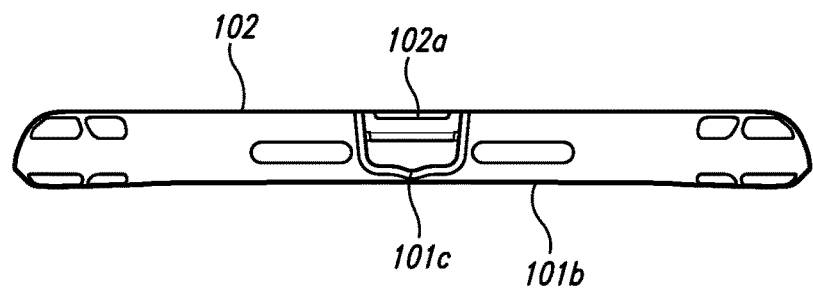
FIG. 5 is a side-elevational view of tablet case assembly of FIG. 1 showing electrical-power-coupler docking bay cover removed tablet case assembly thereby showing electrical-power-coupler docking bay.

Turning to FIG. 3, depicted therein is a rear perspective view of tablet case assembly 100 of FIG. 1 showing electrical-power-coupler docking bay cover 106 removed from tablet case assembly 100 thereby showing electrical-power-coupler docking bay 108, which is also shown in FIGS. 4 and 5.

Figure 6:
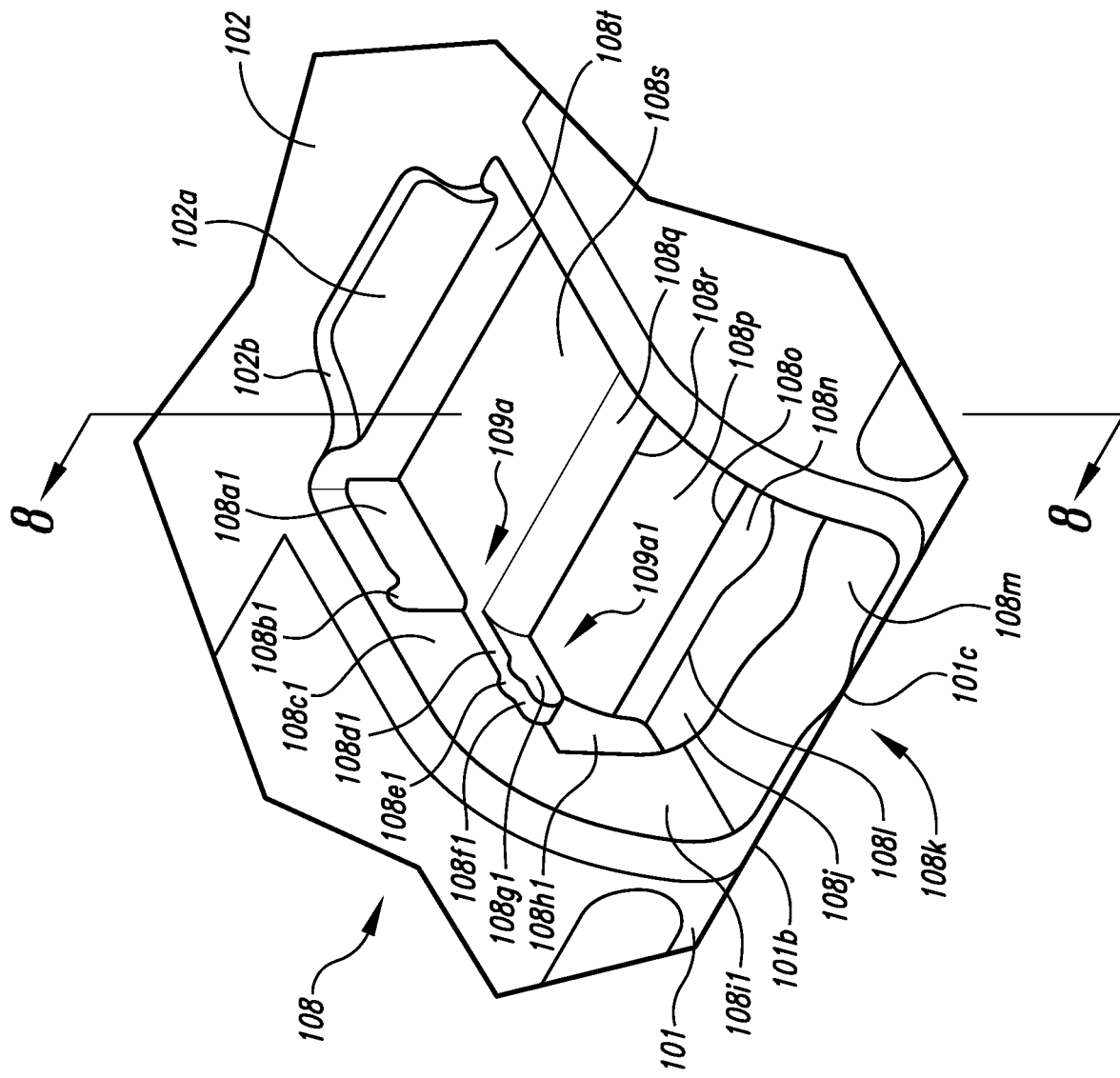
FIG. 6 is an enlarged rear perspective view of a portion of tablet case assembly of FIG. 1 showing further detail of electrical-power-coupler docking bay.

Turning to FIG. 6, depicted therein is an enlarged rear perspective view of a portion of tablet case assembly 100 of FIG. 1 showing further detail of first bounded case portion exterior surface 102 and electrical-power-coupler docking bay 108; first bounded case portion exterior surface 102 is shown further including bounded case portion finger recess exterior face 102b. The electrical-power-coupler docking bay 108 is shown further including first docking bay side (e.g., left docking bay side) 109a having first docking bay suspended ledge (e.g., left docking bay suspended ledge) 109a1 and having first docking bay side longitudinally elongated groove (e.g., left docking bay side longitudinally elongated groove) 108a1, first docking bay side longitudinally elongated groove notch (e.g., left docking bay side longitudinally elongated groove notch) 108b1, first docking bay side face first portion (e.g., left docking bay side face rear upper portion) 108c1, first docking bay side face recessed portion (e.g., left docking bay face recessed portion) 108h1, first docking bay side face second portion (e.g. left docking bay side face front lower portion) 108i1, first docking bay center flange ledge surface (e.g., front lower docking bay center flange ledge surface) 108j, peripheral portion coupler pry notch 108k, tablet receiving curvilinear flange surface first edge (e.g., tablet receiving curvilinear flange surface front edge) 108l, first docking bay center ledge surface (e.g., docking bay front lower center ledge surface) 108m, tablet receiving curvilinear flange surface 108n, tablet receiving curvilinear flange surface second edge (e.g., tablet receiving curvilinear flange surface rear edge) 108o, docking bay tablet access opening 108p, first docking bay center face (e.g., first docking bay midway center face) 108q, first docking bay center face first edge (e.g., docking bay rear center face lower edge) 108r, second docking bay center ledge surface (e.g. docking bay rear upper center ledge surface) 108s, second docking bay center face (e.g. second docking bay upper center face) 108t, first docking bay side 109a, and first docking bay suspended ledge 109a1; and with first docking bay suspended ledge 109a1 having first docking bay side suspended ledge first surface (e.g., left docking bay side suspended ledge top surface) 108d1, first docking bay side suspended ledge nub (e.g., left docking bay side suspended ledge nub) 108e1, first docking bay side suspended ledge first face (e.g., left docking bay side suspended ledge front face) 108f1, and first docking bay side suspended ledge second face (e.g., left docking bay side suspended ledge side face) 108g1. The a peripheral portion coupler pry notch 108k is shown sized and shaped to allow finger access to pry the electrical power coupler 120 from engagement with electrical-power-capable receptacle 14 of the electronic tablet computing device 10. The electrical-power-capable receptacle 14 can be selected from various versions found with electronic tablet computing device 10 such as iPad lightning jacks or USB-C jacks or other USB jacks. According to Wikipedia.org, Lightning is a proprietary computer bus and power connector created and designed by Apple Inc., which is used to connect Apple mobile devices like iPhones, iPads, and iPods to host computers, external monitors, cameras, USB battery chargers, and other peripherals. Lightning receptacle pin configuration includes pin 1 ground, pin 2 lane 0 positive, pin 3 lane 0 negative, pin 4 identification/control 0, pin 5 power (charger or battery), pin 6 lane 1 negative, pin 7 lane 1 positive, and pin 8 identification control 1.

USB-C formally known as USB Type-C, is a 24-pin USB connector system, which is distinguished by its two-fold rotationally-symmetrical connector. The USB Type-C Specification 1.0 was published by the USB Implementers Forum (USB-IF) and was finalized in August 2014. It was developed at roughly the same time as the USB 3.1 specification. In July 2016, it was adopted by the IEC as "IEC 62680-1-3". For instance, USB-C receptacle A pin layout includes pin A1 ground return, pin A2 SuperSpeed differential pair #1, TX positive, pin A3 SuperSpeed differential pair #1, TX, negative, pin A4 bus power, pin A5 configuration channel, pin A6 USB 2.0 differential pair, position 1, positive, pin A7 USB 2.0 differential pair, position 1, negative, pin A8 sideband use, pin A9 bus power, pin A10 SuperSpeed differential pair #4, RX, negative, pin A11 SuperSpeed differential pair #4, RX, positive, and pin A12 ground return. Other USB-C receptacle B pin layout is another layout.

As shown, first docking bay center ledge surface 108m and second docking bay center ledge surface 108s, are progressively farther in distance, respectively, from the peripheral portion first edge 101b along a dimension substantially normal to the peripheral portion first edge 101b and substantially parallel with the first bounded case portion exterior surface 102. In other words, first docking bay center ledge surface 108m and second docking bay center ledge surface 108s are shown progressively farther in distance, respectively, from the peripheral portion first edge 101b along a dimension substantially normal to the peripheral portion first edge 101b and substantially normal to the first bounded case portion exterior surface 102 so that first docking bay center ledge surface 108m and second docking bay center ledge surface 108s are progressively farther along substantially a stairs formation, respectively, from the peripheral portion first edge 101b.

Figure 7:
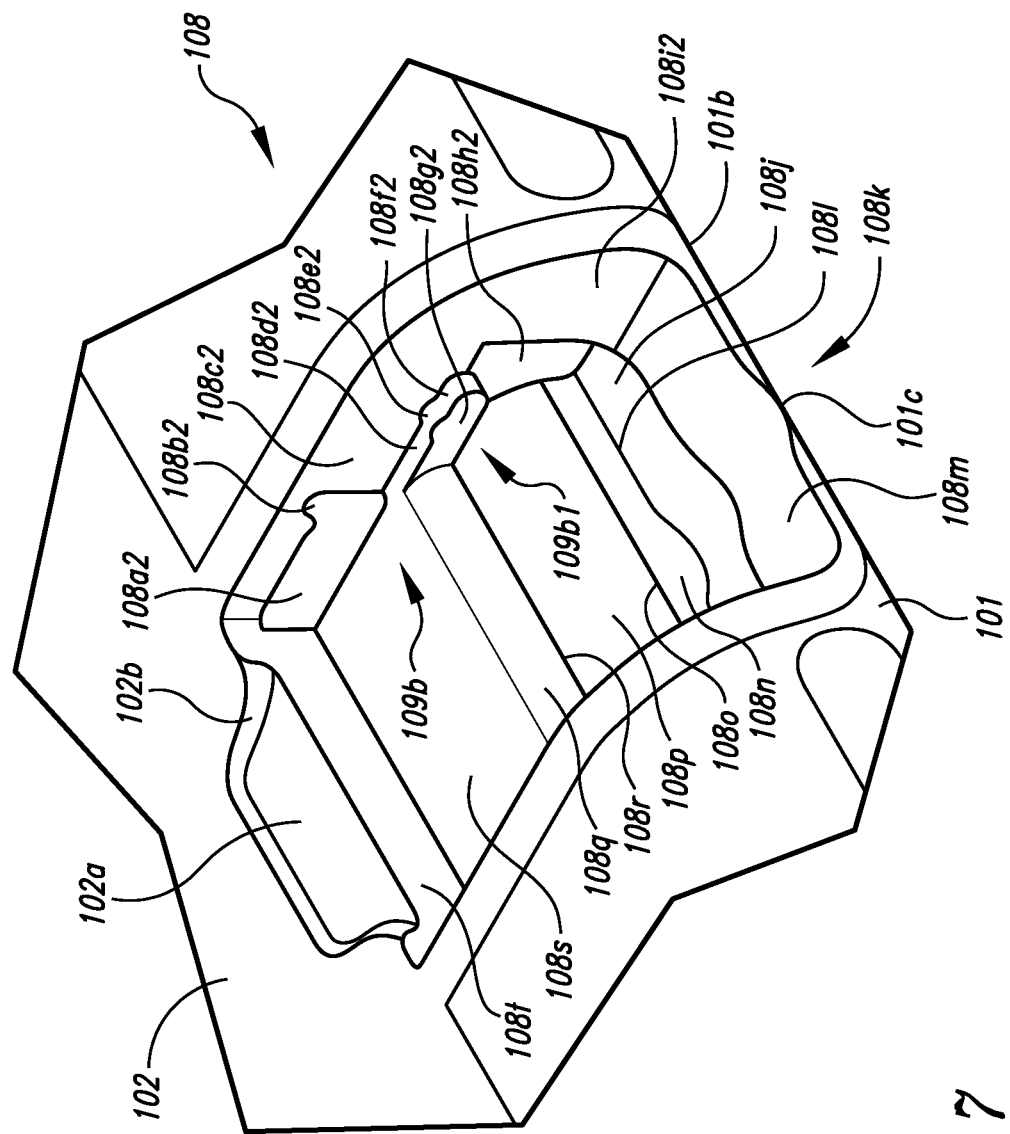
FIG. 7 is an enlarged rear perspective view of a portion of tablet case assembly of FIG. 1 showing further detail of electrical-power-coupler docking bay.
Figure 8:
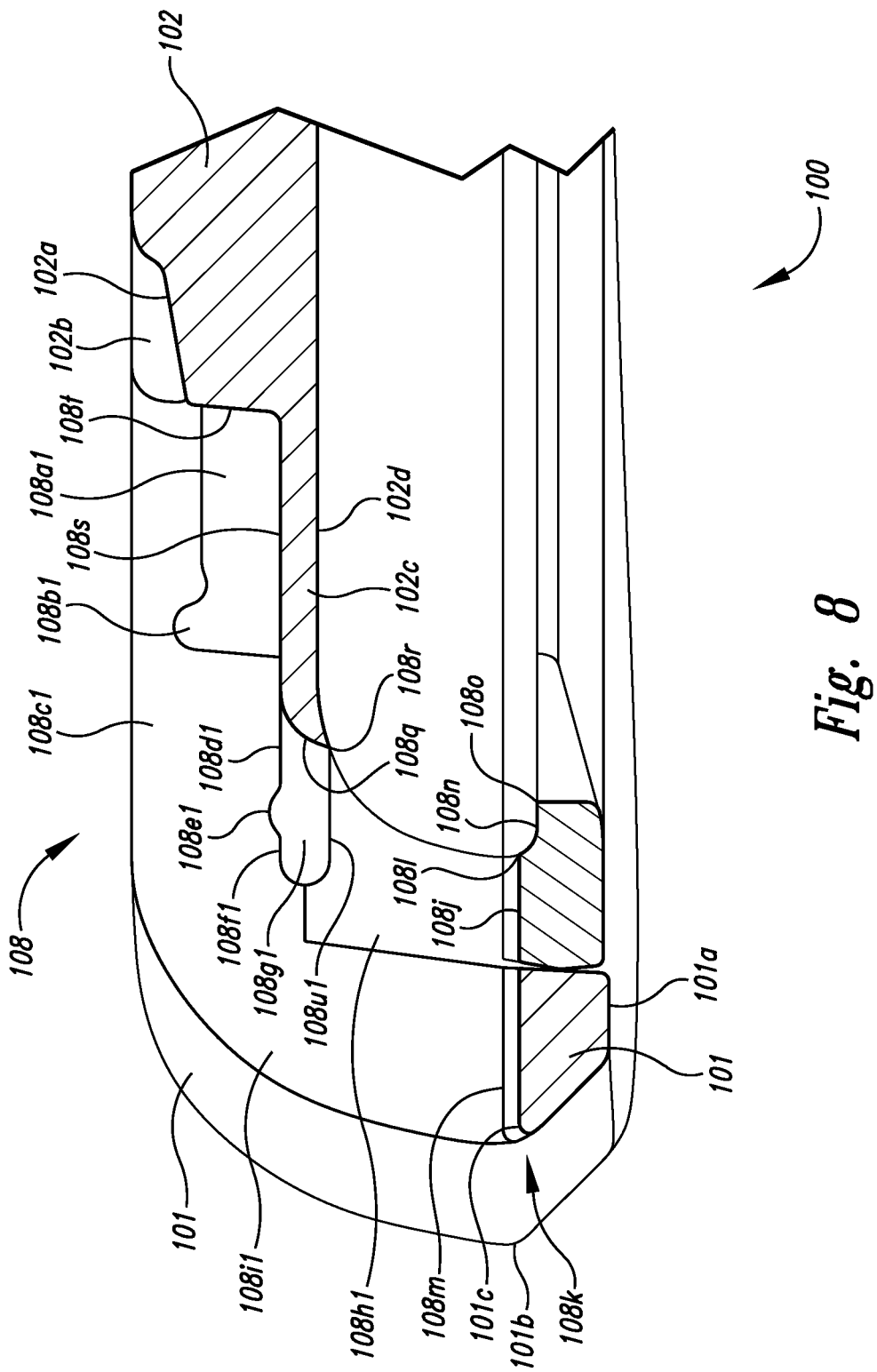
FIG. 8 is a side-elevational cross-sectional view taken along the 8-8 cut-line of FIG. 6 of electrical-power-coupler docking bay.
Figure 9:
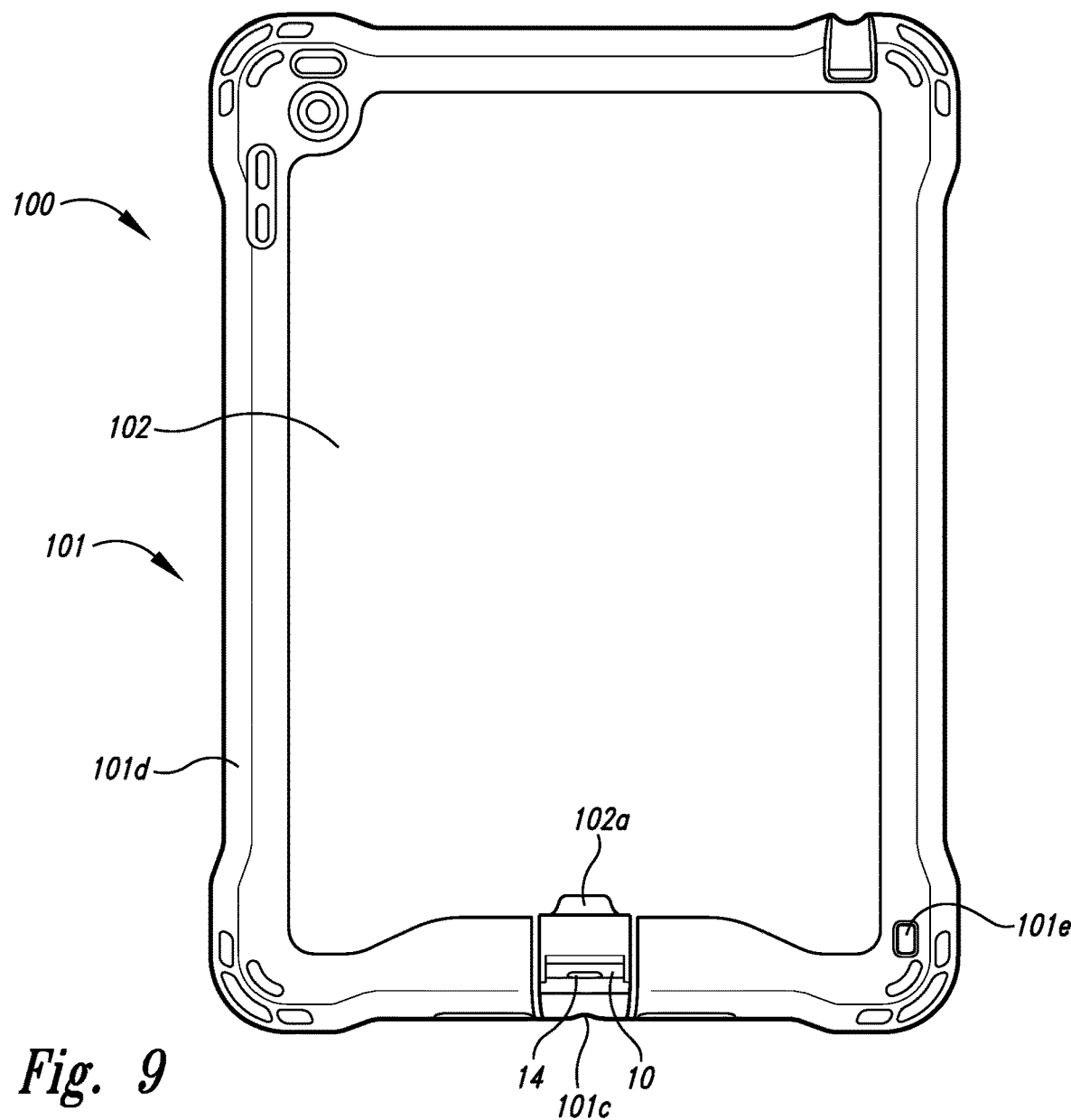
FIG. 9 is a bottom plan rear view of tablet case assembly of FIG. 1 showing electrical-power-coupler docking bay and also showing electronic tablet computing device 10 being contained by tablet case assembly.
Figure 10:
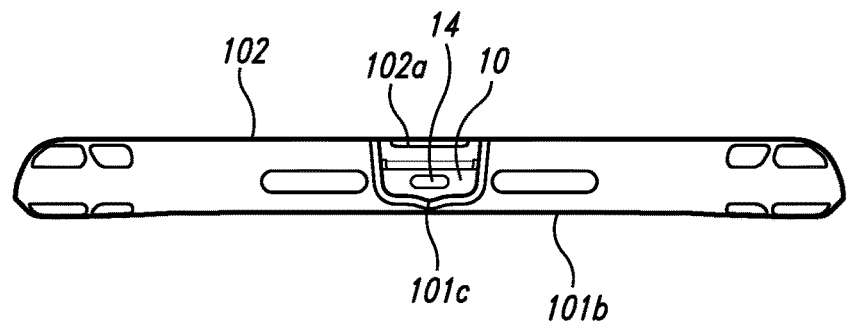
FIG. 10 is a side-elevational view of tablet case assembly of FIG. 1 showing electrical-power-coupler docking bay and also showing electronic tablet computing device 10 being contained by tablet case assembly.
Figure 11:
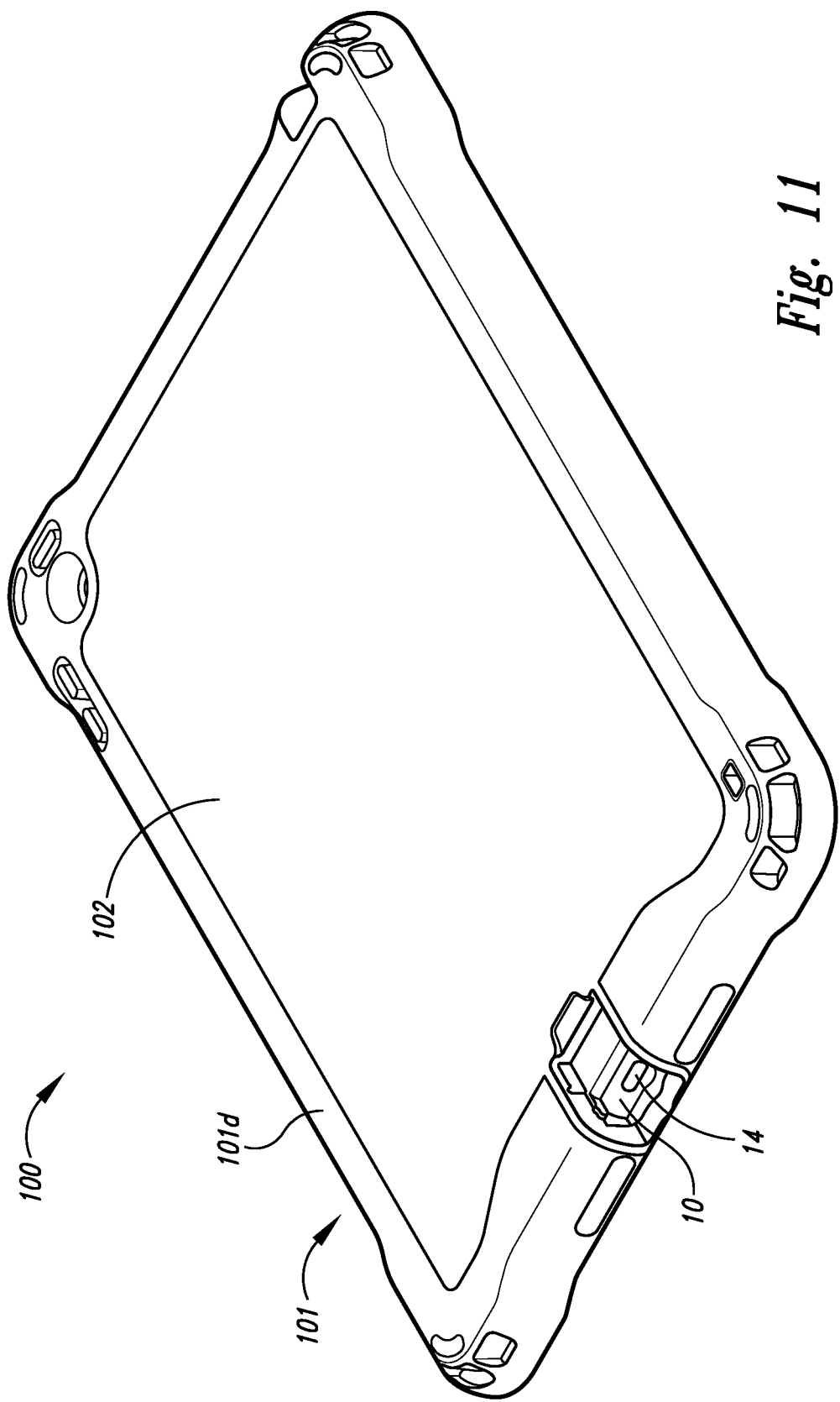
FIG. 11 is a rear perspective view of tablet case assembly of FIG. 1 showing electrical-power-coupler docking bay and also showing electronic tablet computing device being contained by tablet case assembly.
Figure 12:
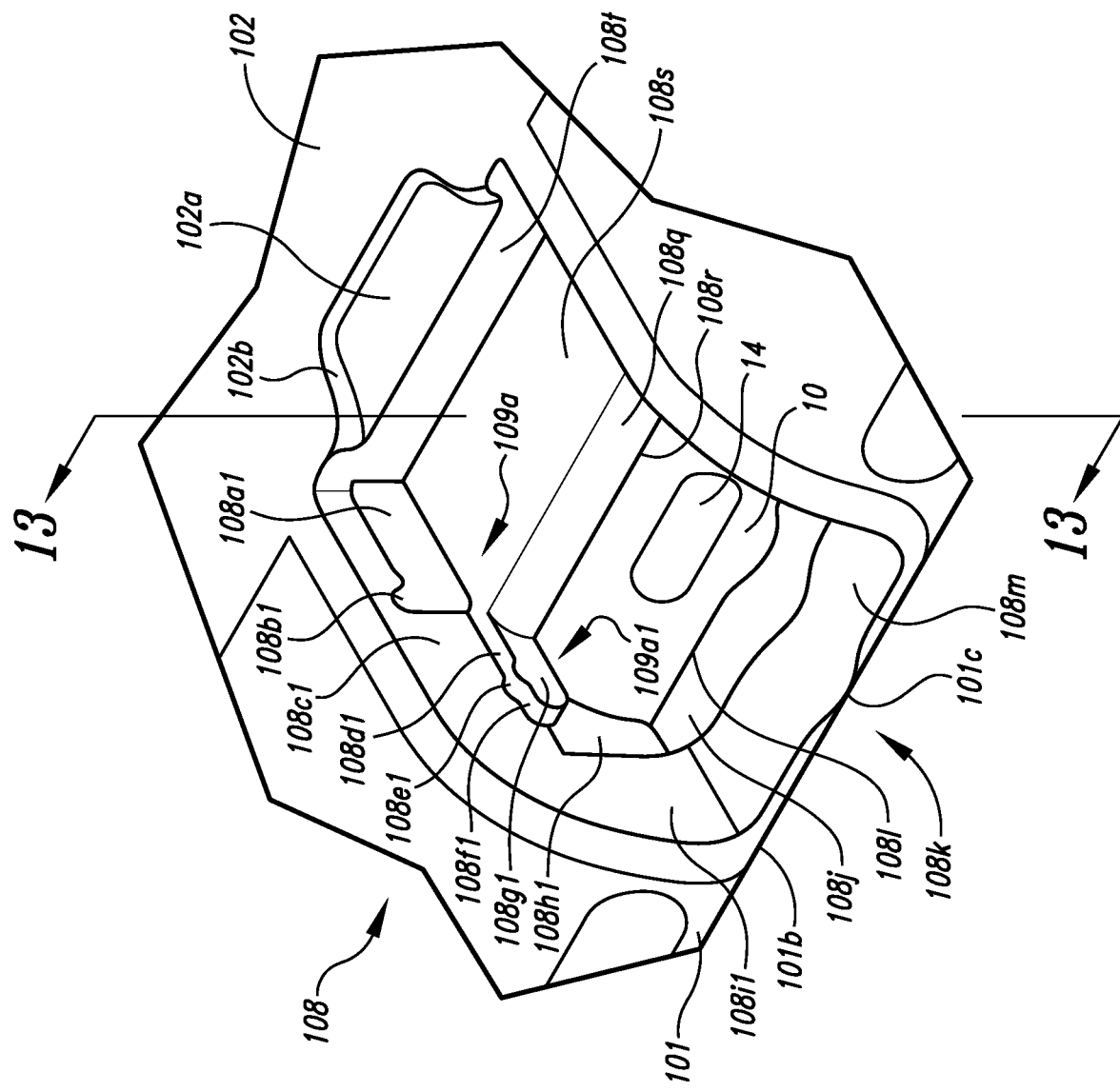
FIG. 12 is an enlarged rear perspective view of a portion of tablet case assembly of FIG. 1 showing further detail of electrical-power-coupler docking bay and showing electronic tablet computing device being contained by tablet case assembly.
Figure 13:
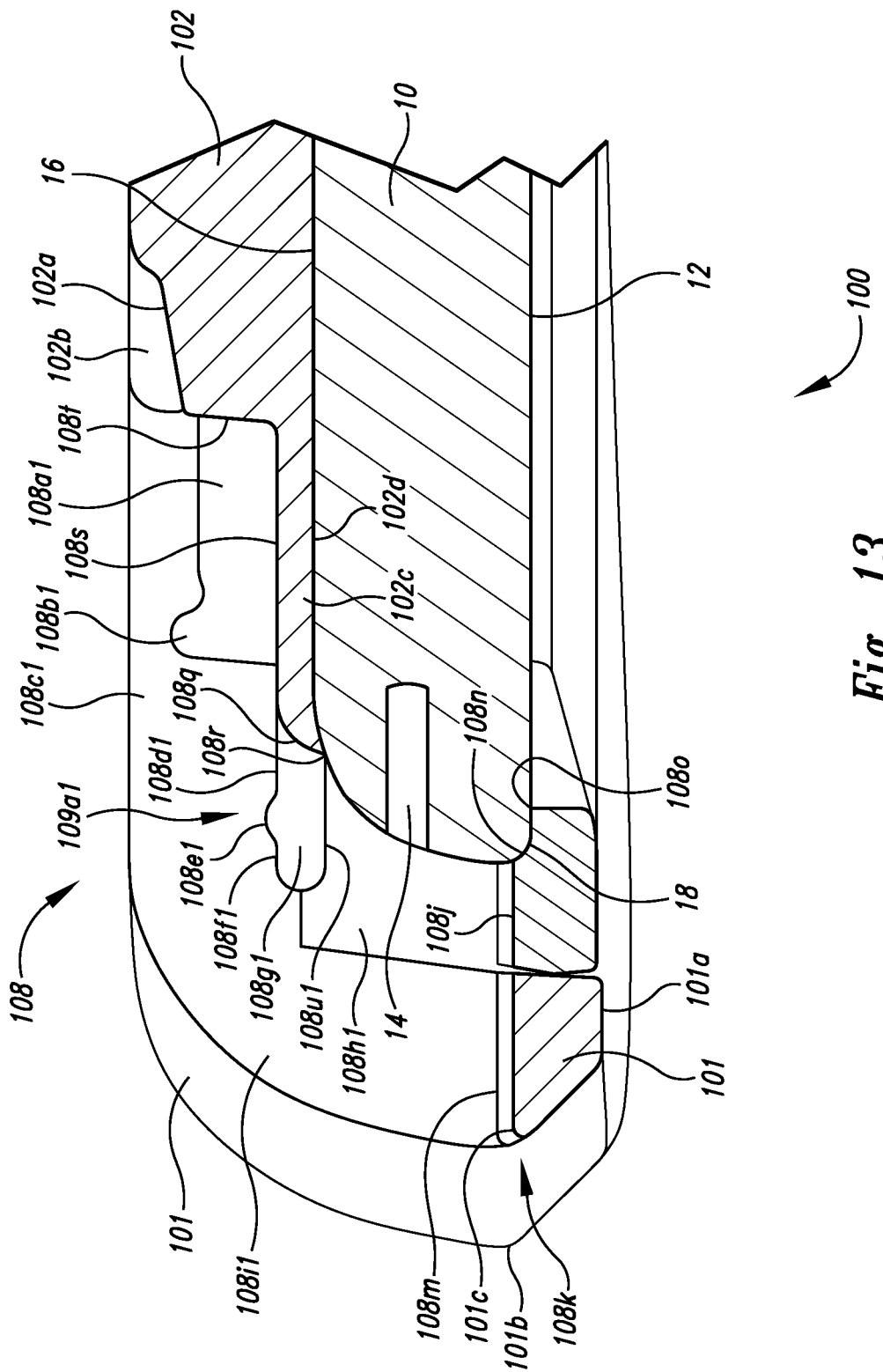
FIG. 13 is a side-elevational cross-sectional view taken along the 13-13 cut-line of FIG. 12 of electrical-power-coupler docking bay.

Further shown in FIG. 7, electrical-power-coupler docking bay 108 includes second docking bay side (e.g. left docking bay side) 109b having second docking bay suspended ledge (e.g., right docking bay suspended ledge) 109b1 and having second docking bay side longitudinally elongated groove (e.g. right docking bay side longitudinally elongated groove) 108a2, second docking bay side longitudinally elongated groove notch (e.g., right docking bay side longitudinally elongated groove notch) 108b2, second docking bay side face first portion (e.g., right docking bay side face rear upper portion 108c2, second docking bay side face recessed portion (e.g., right docking bay side face recessed portion) 108h2, and second docking bay side face second portion (e.g., right docking bay side face lower portion) 108i2; and with second docking bay suspended ledge 109b1 having second docking bay side suspended ledge first surface (e.g., right docking bay side suspended ledge top surface) 108d2, second docking bay side suspended ledge nub (e.g., right docking bay side suspended ledge nub) 108e2, second docking bay side suspended ledge first face (e.g., right docking bay side suspended ledge front face) 108f2, and second docking bay side suspended ledge second face (e.g., right docking bay side suspended ledge side face) 108g2. Shown in FIG. 8, first bounded case portion exterior surface 102 includes first bounded case portion (e.g., rear bounded case portion) 102c and first bounded case portion interior surface (e.g., rear bounded case portion interior surface) 102d; and first docking bay suspended ledge 109a1 also has first docking bay side suspended ledge second surface (e.g., left docking bay side suspended ledge bottom surface) 108u1 and similarly, although not shown, it follows that second docking bay suspended ledge 109b1 also has second docking bay side suspended ledge second surface (e.g., right docking bay side suspended ledge bottom surface) 108u2. Turning to FIGS. 9-13, depicted therein is tablet case assembly 100 containing electronic tablet computing device 10, which includes electrical-power-capable receptacle 14. Also shown is electronic tablet computing device 10 including tablet back rear surface 16 and display-side curvilinear tablet edge 18.

Turning to FIG. 14, depicted therein is a front perspective view of electrical power coupler 120, which includes coupler base portion 121a and coupler extension portion 121b, with coupler extension portion 121b including first coupler center face 120a, first coupler side face first portion (e.g., right coupler side face rear portion) 120c1, and first coupler side face pin (e.g. right coupler side face pin) 120f1, and with coupler base portion 121a including first coupler side face longitudinally elongated groove 120d1, first coupler side face notch (e.g., right coupler side face notch) 120e1, first coupler face second portion (e.g. right coupler side face front portion) 120g1, second coupler center surface (e.g., front coupler lower bottom surface) 120h second coupler center face (e.g. front coupler center face) 120i, first coupler electrode (e.g., right coupler electrode) 120j, first coupler electrode exterior surface (e.g., right coupler electrode exterior surface) 120j1, second coupler electrode (e.g., left coupler electrode) 120k, second coupler electrode exterior surface (e.g., left coupler electrode exterior surface) 120k1, coupler electrode support surface 120l, and coupler electrode support 120m. Both first coupler electrode 120j and second coupler electrode 120k can be magnetized with the same magnetic polarities or opposite magnetic polarities to assist in coupling them to one or more electrical charging devices (not shown).

Figure 15:
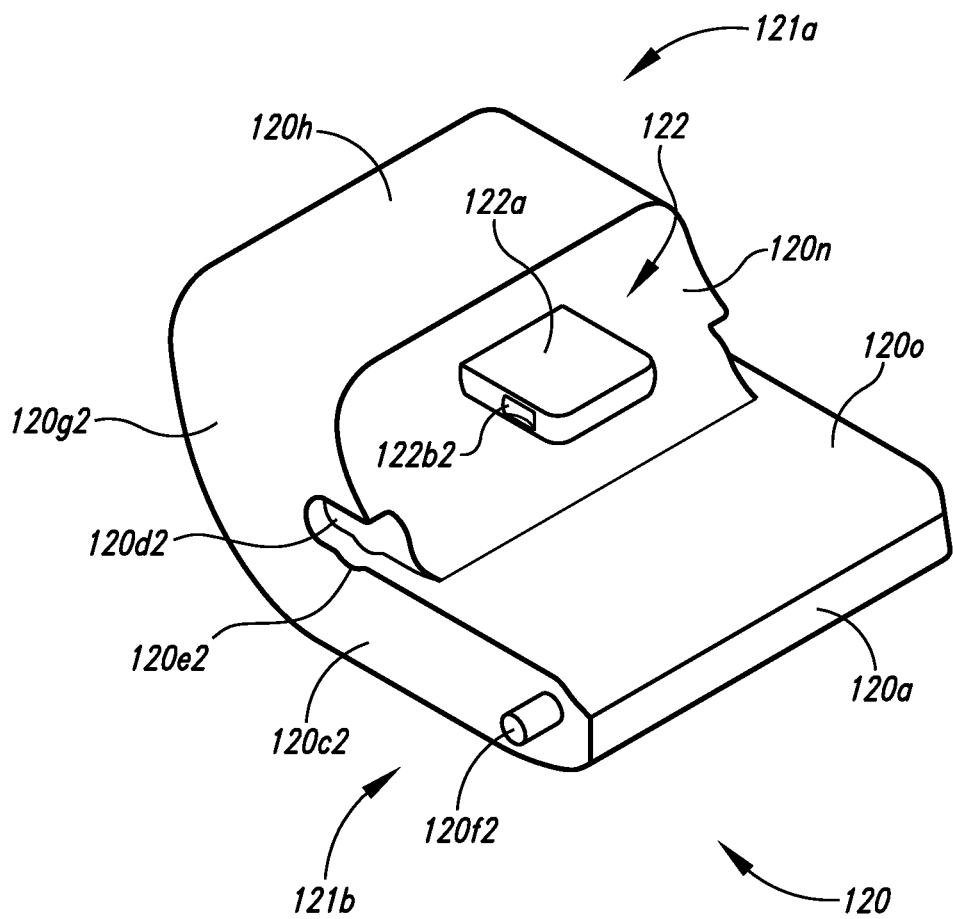
FIG. 15 is a rear perspective view of electrical power coupler.
Figure 16:
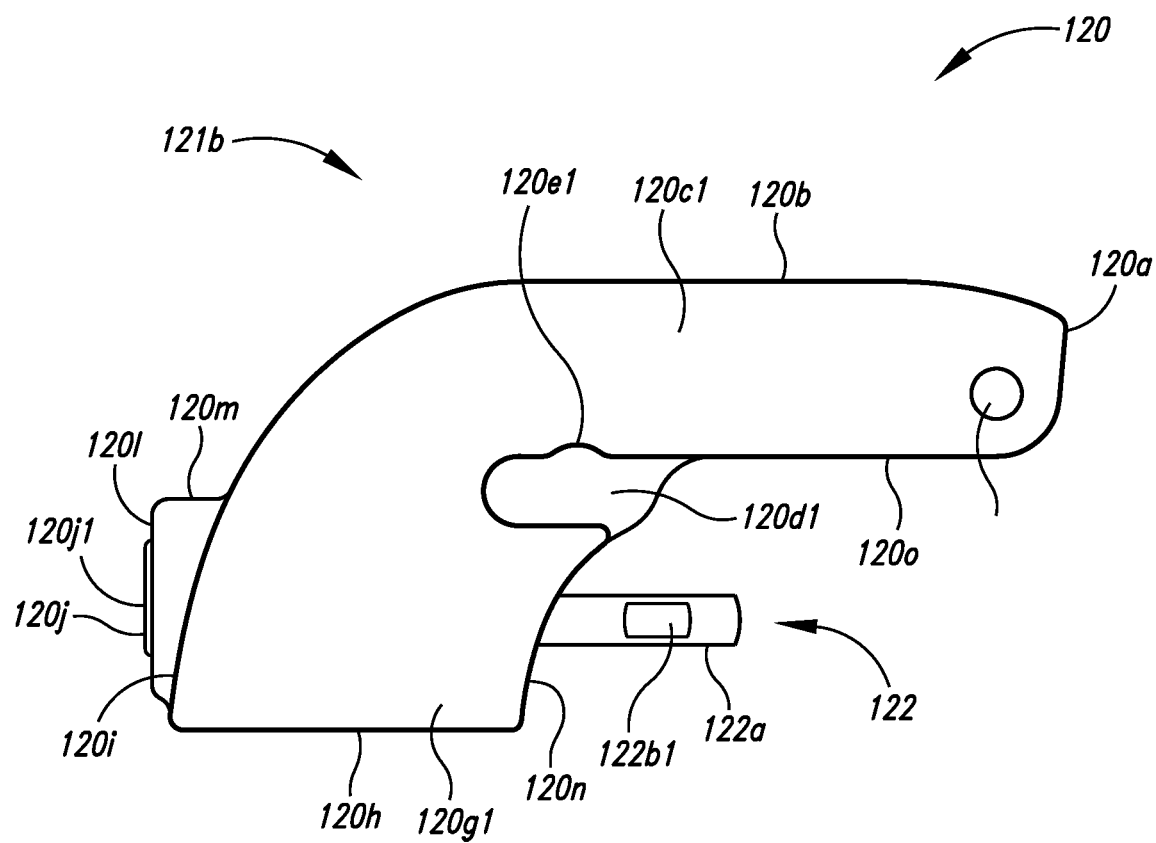
FIG. 16 is side-elevational view of electrical power coupler.
Figure 17:
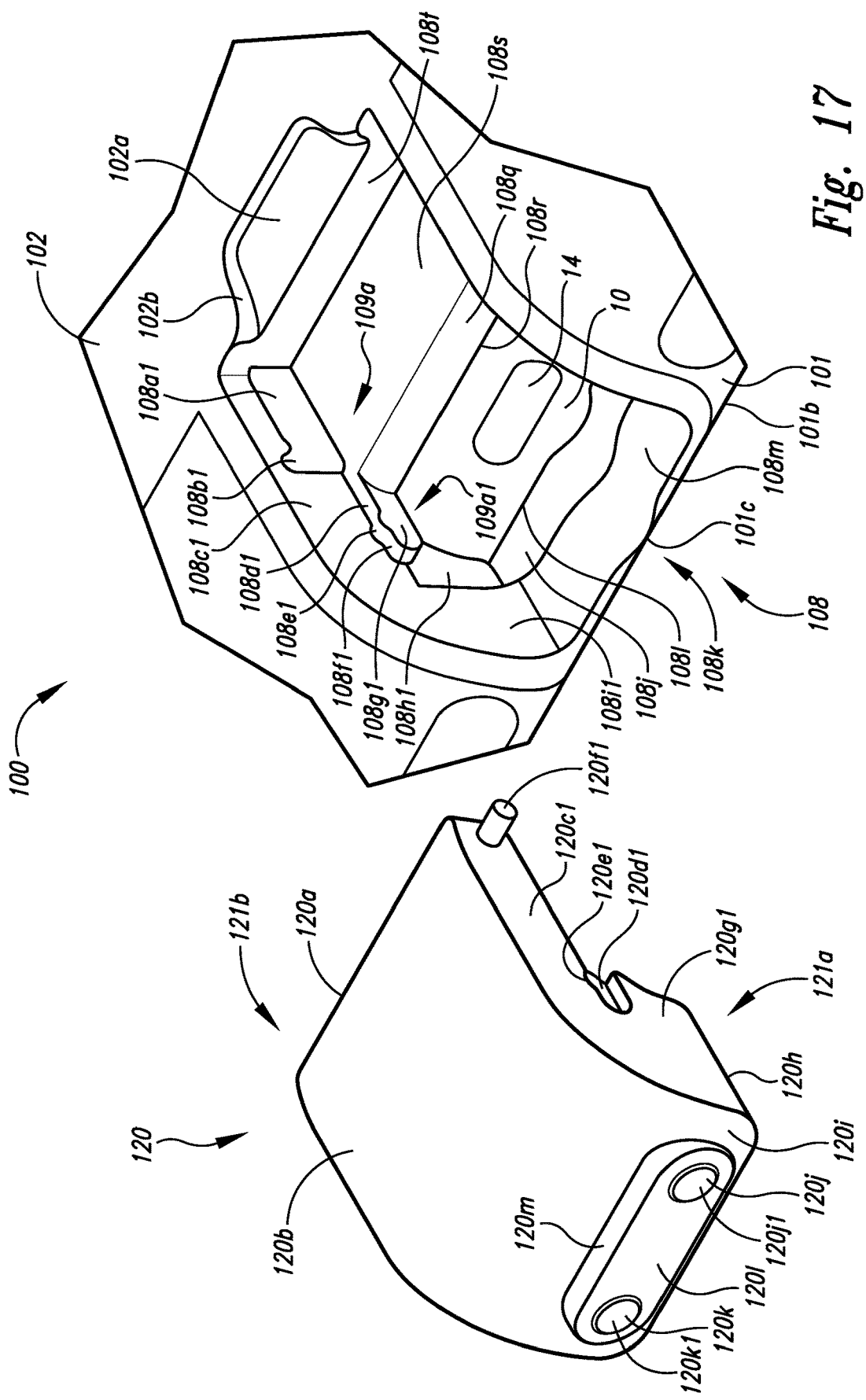
FIG. 17 is a front perspective view of electrical power coupler of FIG. 14 and an enlarged rear perspective view of a portion of tablet case assembly of FIG. 1 showing further detail of electrical-power-coupler docking bay and showing electronic tablet computing device being contained by tablet case assembly.

Further shown in FIG. 15, coupler extension portion 121*b* includes third coupler center face (e.g., rear lower coupler center face) 120*n* with coupler plug 122 extending therefrom and having coupler plug electrically conductive contacts 122*a* being in electrical connection with first coupler electrode 120*j* and with second coupler electrode 120*k*; and also having second coupler plug notch (e.g., left coupler plug notch) 122*b*2. Also shown, coupler extension portion 121*b* further includes second coupler side face longitudinally elongated groove (e.g., left coupler side face longitudinally elongated groove) 120*d*2, second coupler face notch (e.g., left coupler side face longitudinally elongated groove) 120*e*2, and second coupler side face second portion (e.g., left coupler side face front portion) 120*g*2. Coupler base portion 121*a* is shown to include second coupler side face first portion (e.g., left coupler side face rear portion) 120*c*2, second coupler side face pin (e.g. left coupler side face pin) 120*f*2, and third coupler center surface (e.g., rear coupler upper bottom surface) 120*o*. Turning to FIG. 16, depicted therein coupler plug 122 also includes first coupler plug notch (e.g., right coupler plug notch) 122*b*1. As depicted in FIG. 17, electrical power coupler 120 is shown being positioned to be coupled with electrical-power-coupler docking bay 108. As shown in FIGS. 14-17 and further Figures below, the electrical-power-coupler docking bay 108 being sized and shaped to detachably engage with an electrical power coupler 120, the electrical power coupler 120 capable of coupling with the electrical-power-capable receptacle 14 of the electronic tablet computing device 10, wherein the electrical-power-coupler docking bay 108 being sized and shaped to be engaged with the electrical power coupler 120 coupled with the electrical-power-capable receptacle 14 of the electronic tablet computing device 10 and wherein the electrical-power-coupler docking bay 108 being sized and shaped to be engaged with the electrical power coupler 120 uncoupled from the electrical-power-capable receptacle 14 of the electronic tablet computing device 10.

In FIGS. 18 and 20, first coupler side face pin 120*f*1 and second coupler side face pin 120*f*2, are depicted as being inserted into second docking bay side longitudinally elongated groove notch 108*b*2 and first docking bay side longitudinally elongated groove notch 108*b*1, respectively, with such insertion aided by the spring-loaded depressible nature of first coupler side face pin 120*f*1 and second coupler side face pin 120*f*2.

In FIGS. 19 and 21, first coupler side face pin 120*f*1 and second coupler side face pin 120*f*2 are depicted as being slid along second docking bay side longitudinally elongated groove 108*a*2 and first docking bay side longitudinally elongated groove 108*a*1, respectively, away from first docking bay side longitudinally elongated groove notch 108*b*1 and second docking bay side longitudinally elongated groove notch 108*b*2, respectively, thereby allowing electrical power coupler 120 to be further repositioned to thereby engage second coupler side face longitudinally elongated groove 120*d*2 with first docking bay side suspended ledge first surface 108*d*1, first docking bay side suspended ledge first face 108*f*1, first docking bay side suspended ledge second face 108*g*1, and first docking bay side suspended ledge second surface 108*u*1, engage second coupler side face notch 120*e*2 with first docking bay side suspended ledge nub 108*e*1, engage first coupler side face longitudinally elongated groove (e.g., right coupler side face longi- tudinally elongated groove) 120*d*1 with second docking bay side suspended ledge first surface 108*d*2, second docking bay side suspended ledge first face 108*f*2, second docking bay side suspended ledge second face 108*g*2, and second docking bay side suspended ledge second surface 108*u*2, engage first coupler side face notch 120*e*1 with second docking bay side suspended ledge nub 108*e*2, and engage coupler plug electrically conductive contacts 122*a* with electrical-power-capable receptacle 14 of electronic tablet computing device 10.

As shown in FIG. 21, coupler plug 122 further includes coupler electrode conditioning circuitry 122*c*, electrically conductive member 122*d*, first insulator portion (e.g., upper insulator portion) 122*e*1, second insulator portion (e.g., lower insulator portion) 122*e*2, and electrically conductive coupler plug tip portion 122*f*. In some implementations coupler electrode conditioning circuitry 122*c* is included as an integrated circuit to provide pathways for communication signals such as USB-C or Apple Lightning versions; other implementations solely provide electrical power conduction from a partial selection of the coupler plug electrically conductive contacts 122*a* (so configured such as to match electrical power configurations of such as USB-C or Lightning versions of electrical-power-capable receptacle 14) to first coupler electrode 120*j* and second coupler electrode 120*k*, respectively, (opposite voltage polarities between first coupler electrode 120*j* and second coupler electrode 120*k*).

As shown in FIGS. 6-21, electrical-power-coupler docking bay 108 is sized and shaped to position first docking bay center ledge surface 108*m* and second docking bay center ledge surface 108*s* of electrical-power-coupler docking bay 108 adjacent second coupler center surface 120*h* and third coupler center surface 120*o*, respectively, of electrical power coupler 120 to couple electrical power coupler 120 with electrical-power-capable receptacle 14 of electronic tablet computing device 10. Further shown, first docking bay side longitudinally elongated groove 108*a*1 and first docking bay side longitudinally elongated groove notch 108*b*1 are sized and shaped to couple with electrical power coupler 120. Further, first docking bay side 109*a* includes first docking bay side longitudinally elongated groove notch 108*b*1 and second docking bay side 109*b* includes second docking bay side longitudinally elongated groove notch 108*b*2, which are sized and shaped to couple with second coupler side face pin 120*f*2 and first coupler side face pin 120*f*1, respectively, of the electrical power coupler 120. The electrical-power-coupler docking bay 108 is sized and shaped to allow the electrical power coupler 120 to move between first and second positions with the first docking bay side longitudinally elongated groove notch 108*b*1 and the second docking bay side longitudinally elongated groove notch 108*b*2 being coupled with the second coupler side face pin 120*f*2 and the first coupler side face pin 120*f*1, respectively, in the first position shown such as in FIGS. 19 and 21, the electrical power coupler 120 being coupled with the electrical-power-capable receptacle 14 of the electronic tablet computing device 10, in the second position shown such as in FIGS. 18 and 20, the electrical power coupler 120 being uncoupled with the electrical-power-capable receptacle 14 of the electronic tablet computing device 10. The first docking bay side 109*a* includes first docking bay suspended ledge 109*a*1 and second docking bay side 109*b* includes second docking bay suspended ledge 109*b*1, which are sized and shaped to couple with second coupler side face longitudinally elongated groove 120*d*2, and first coupler side face longitudinally elongated groove 120*d*1, respectively, of the electrical power coupler 120. The first docking bay side suspended ledge nub 108e1 and second docking bay side suspended ledge nub 108e2 are sized and shaped to couple with second coupler side face notch 120e2, and first coupler side face notch 120e1, respectively, of the electrical power coupler 120.

Further shown in FIGS. 6-21, coupler plug 122 is sized and shaped to removably couple with the electrical-power-capable receptacle 14 of the electronic tablet computing device 10, and the electrical power coupler 120 is sized and shaped to removably couple with the electrical-power-coupler docking bay 108 of the tablet case assembly 100. The first coupler side face pin 120f1 and second coupler side face pin 120f2 are positioned on the electrical power coupler 120 to allow electrical power coupler 120 to be coupled with electrical-power-coupler docking bay 108 as electrical power coupler 120 is able to move between a first position with coupler plug 122 being in a coupled condition with electrical-power-capable receptacle 14 of electronic tablet computing device 10 and a second position with coupler plug 122 being in an uncoupled condition from electrical-power-capable receptacle 14. In some implementations coupler plug 122 is configured to couple with at least electrical power conducting portions of an Apple lightning port version of the electrical-power-capable receptacle 14 of the tablet display 12. In some implementations the coupler plug 122 is configured to couple with at least electrical power conducting portions of a USB-C or other USB version of the electrical-power-capable receptacle 14 of the tablet display 12. The first coupler side face longitudinally elongated groove 120d1 and second coupler side face longitudinally elongated groove 120d2 are sized, shaped, and positioned on the coupler plug 122 to couple with the electrical-power-coupler docking bay 108 when the coupler plug 122 is coupled with the electrical-power-capable receptacle 14. The first coupler side face notch 120e1 and second coupler side face notch 120e2 are sized, shaped, and positioned on the coupler plug 122 to couple with the electrical-power-coupler docking bay 108 when the coupler plug 122 is coupled with the electrical-power-capable receptacle 14. The electrical power coupler 120 is sized and shaped to be positioned adjacent a two-step staircase formation of the electrical-power-coupler docking bay 108. The coupler plug 122 is being in electrical connection with the first coupler electrode 120j and with the second coupler electrode 120k including coupler electrode conditioning circuitry 122c. The second coupler electrode exterior surface 120k1, first coupler electrode exterior surface 120j1 and second coupler electrode exterior surface 120k1 are shown as substantially flat, but in other implementations the can be other shapes to accommodate connection with various terminals of electrical charging devices (not shown). In some implementations first coupler electrode 120j and second coupler electrode 120k can include one or more magnetic polarities but in other implementations they are non-magnetic. In some implementations, as shown, first coupler electrode 120j and second coupler electrode 120k extend from coupler base portion 121a in a first direction, whereas coupler extension portion 121b extends from coupler base portion 121a in a second direction substantially opposite from the first direction; and in some implementations, as shown, coupler plug 122 extends from coupler base portion 121a in substantially the same direction as the second direction. In some implementations, as shown, first coupler side face pin 120f1 and second coupler side face pin 120f2 are so positioned to engage with second coupler side face longitudinally elongated groove 120d2 and first coupler side face longitudinally elongated groove 120d1 of electrical-power-coupler docking bay 108 when electrical power coupler 120 is coupled with electrical-power-coupler docking bay 108. As shown, coupler extension portion 121b of electrical power coupler 120 includes first coupler center face 120a, and coupler base portion 121a of electrical power coupler 120 includes second coupler center face 120i, and third coupler center face 120n, with first coupler electrode 120j and second coupler electrode 120k extending from second coupler center face 120i, and coupler plug 122 extending from third coupler center face 120n and facing in a direction opposite that second coupler center face 120i is facing and with one or more portions of the third coupler center face 120n having a curvilinear profile to conform with a curvilinear profile of the electronic tablet computing device 10. As shown, second coupler center surface 120h, and third coupler center surface 120o are arranged in a stair-step formation with coupler plug 122 extending out from third coupler center face 120n, and coupler plug 122 extending out over, spaced apart, and substantially parallel with third coupler center surface 120o of first coupler center face 120a. As shown, first coupler electrode exterior surface 120j1 and second coupler electrode exterior surface 120k1 are positioned to be aligned substantially normal to tablet display 12 of electronic tablet computing device 10 when coupler plug 122 of electrical power coupler 120 is coupled with electrical-power-capable receptacle 14 of electronic tablet computing device 10. These structures thus provide for a method for electrical power coupler 120 which can include coupling electrical power coupler 120 with tablet case assembly 100; coupling coupler plug 122 of electrical power coupler 120 with electrical-power-capable receptacle 14 of electronic tablet computing device 10 while electrical power coupler 120 remains coupled with tablet case assembly 100; and uncoupling coupler plug 122 of electrical power coupler 120 from electrical-power-capable receptacle 14 of electronic tablet computing device 10 while electrical power coupler 120 remains coupled with tablet case assembly 100.

FIG. 22 is a cross-sectional view of electrical-power-coupler docking bay cover.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An electrical power coupler for an electronic tablet computing device, the electronic tablet computing device having an electrical-power-capable receptacle, the electrical power coupler for a tablet case assembly, the tablet case assembly having an electrical-power-coupler docking bay, the electrical power coupler comprising:
   a coupler plug sized and shaped to removably couple with the electrical-power-capable receptacle of the electronic tablet computing device, the electrical power coupler sized and shaped to removably couple with the electrical-power-coupler docking bay of the tablet case assembly;
   a first coupler electrode;
   a second coupler electrode, the coupler plug being in electrical connection with the first coupler electrode and with the second coupler electrode; and
   a coupler base portion and a coupler extension portion, the first coupler electrode and the second coupler electrode extending from the coupler base portion in a first direction, the coupler extension portion extending from the coupler base portion in a second direction substantially opposite from the first direction,
   wherein the coupler extension portion of the electrical power coupler includes a first coupler center face, and the coupler base portion of the electrical power coupler includes a second coupler center face, and a third coupler center face, the first coupler electrode and the second coupler electrode extending from the second coupler center face, the coupler plug extending from the third coupler center face facing in a direction opposite of the second coupler center face is facing, one or more portions of the third coupler center face of a curvilinear profile to conform with a curvilinear profile of the electronic tablet computing device.

2. The electrical power coupler of claim 1 further comprising: a first coupler side face pin and a second coupler side face pin positioned on the electrical power coupler to allow the electrical power coupler to be coupled with the electrical-power-coupler docking bay as the electrical power coupler is able to move between a first position with the coupler plug being in a coupled condition with the electrical-power-capable receptacle of the electronic tablet computing device and a second position with the coupler plug being in an uncoupled condition from the electrical-power-capable receptacle.

3. The electrical power coupler of claim 1 wherein the coupler plug is configured to couple with at least electrical power conducting portions of a lighting port version of the electrical-power-capable receptacle of the tablet display.

4. The electrical power coupler of claim 1 wherein the coupler plug is configured to couple with at least electrical power conducting portions of a USB-C version of the electrical-power-capable receptacle of the tablet display.

5. The electrical power coupler of claim 1 further comprising: a first coupler side face longitudinally elongated groove and a second coupler side face longitudinally elongated groove sized, shaped, and positioned on the coupler plug to couple with the electrical-power-coupler docking bay when the coupler plug is coupled with the electrical-power-capable receptacle.

6. The electrical power coupler of claim 1 further comprising: a first coupler side face notch and a second coupler side face notch sized, shaped, and positioned on the coupler plug to couple with the electrical-power-coupler docking bay when the coupler plug is coupled with the electrical-power-capable receptacle.

7. The electrical power coupler of claim 1 the electrical power coupler sized and shaped to be positioned adjacent a two-step staircase formation of the electrical-power-coupler docking bay.

8. The electrical power coupler of claim 1 wherein the coupler plug being in electrical connection with the first coupler electrode and with the second coupler electrode including coupler electrode conditioning circuitry.

9. The electrical power coupler of claim 1 wherein the first coupler electrode further comprises a first coupler electrode exterior surface and the second coupler electrode further comprises a second coupler electrode exterior surface, the first coupler electrode exterior surface and the second coupler electrode exterior surface being substantially flat.

10. The electrical power coupler of claim 1 wherein the first coupler electrode and the second coupler electrode include one or more magnetic polarities.

11. The electrical power coupler of claim 1 wherein the coupler plug being extended from the coupler base portion in substantially the same direction as the second direction.

12. The electrical power coupler of claim 1 wherein the coupler extension portion includes a first coupler side face pin and a second coupler side face pin so positioned to engage with a second coupler side face longitudinally elongated groove and a first coupler side face longitudinally elongated groove of the electrical-power-coupler docking bay when the electrical power coupler is coupled with the electrical-power-coupler docking bay.

13. The electrical power coupler of claim 12 wherein the first coupler center surface of the electrical power coupler includes a first coupler center surface, a second coupler center surface, and a third coupler center surface, the second coupler center surface, and the third coupler center surface arranged in a stair-step formation with the coupler plug extending out from the third coupler center face, the coupler plug extending out over, spaced apart, and substantially parallel with the third coupler center surface of the first coupler center face.

14. The electrical power coupler of claim 12 wherein the first coupler electrode further comprises a first coupler electrode exterior surface and the second coupler electrode further comprises a second coupler electrode exterior surface, the first coupler electrode exterior surface and the second coupler electrode exterior surface positioned to be aligned substantially normal to a tablet display of the electronic tablet computing device when the coupler plug of the electrical power coupler is coupled with the electrical-power-capable receptacle of the electronic tablet computing device.

15. An electrical power coupler for an electronic tablet computing device, the electronic tablet computing device having an electrical-power-capable receptacle, the electrical power coupler for a tablet case assembly, the tablet case assembly having an electrical-power-coupler docking bay, the electrical power coupler comprising:
- a coupler plug sized and shaped to removably couple with the electrical-power-capable receptacle of the electronic tablet computing device, the electrical power coupler sized and shaped to removably couple with the electrical-power-coupler docking bay of the tablet case assembly;
- a first coupler electrode;
- a second coupler electrode, the coupler plug being in electrical connection with the first coupler electrode and with the second coupler electrode;
- a first coupler side face longitudinally elongated groove and a second coupler side face longitudinally elongated groove sized, shaped, and positioned on the coupler plug to couple with the electrical-power-coupler docking bay when the coupler plug is coupled with the electrical-power-capable receptacle; and
- a first coupler side face notch and a second coupler side face notch sized, shaped, and positioned on the coupler plug to couple with the electrical-power-coupler docking bay when the coupler plug is coupled with the electrical-power-capable receptacle; and
- a coupler base portion and a coupler extension portion, the first coupler electrode and the second coupler electrode extending from the coupler base portion a in a first direction, the coupler extension portion extending from the coupler base portion in a second direction substantially opposite from the first direction, the electrical power coupler sized and shaped to be positioned adjacent a two-step staircase formation of the electrical-power-coupler docking bay; and
- a first coupler side face pin and a second coupler side face pin positioned on the electrical power coupler to allow the electrical power coupler to be coupled with the electrical-power-coupler docking bay as the electrical power coupler is able to move between a first position with the coupler plug being in a coupled condition with the electrical-power-capable receptacle of the electronic tablet computing device 10 and a second position with the coupler plug being in an uncoupled condition from the electrical-power-capable receptacle.

16. The electrical power coupler of claim 15 wherein the coupler extension portion of the electrical power coupler includes a first coupler center face, and the coupler base portion of the electrical power coupler includes a second coupler center face, and a third coupler center face, the first coupler electrode and the second coupler electrode extending from the second coupler center face, the coupler plug extending from the third coupler center face facing in a direction opposite of the second coupler center face is facing, one or more portions of the third coupler center face of a curvilinear profile to conform with a curvilinear profile of the electronic tablet computing device.

17. The electrical power coupler of claim 16 wherein the first coupler center surface of the electrical power coupler includes the first coupler center surface, the second coupler center surface, and the third coupler center surface, the second coupler center surface, and the third coupler center surface arranged in a stair-step formation with the coupler plug extending out from the third coupler center face, the coupler plug extending out over, spaced apart, and substantially parallel with the third coupler center surface of the first coupler center face.

* * * * *